US010080979B2

(12) United States Patent
Lane

(10) Patent No.: US 10,080,979 B2
(45) Date of Patent: Sep. 25, 2018

(54) SYSTEMS, DEVICES, AND METHODS FOR MOLDING STRUCTURES

(71) Applicant: Create A Castle, LLC, New Milford, CT (US)

(72) Inventor: Kevin Lane, New Milford, CT (US)

(73) Assignee: Create A Castle, LLC, New Milford, CT (US)

( * ) Notice: Subject to any disclaimer, the term of this patent is extended or adjusted under 35 U.S.C. 154(b) by 0 days.

(21) Appl. No.: 15/874,877

(22) Filed: Jan. 18, 2018

(65) Prior Publication Data

US 2018/0207542 A1 Jul. 26, 2018

Related U.S. Application Data

(63) Continuation-in-part of application No. 29/630,894, filed on Dec. 22, 2017, and a continuation-in-part of
(Continued)

(51) Int. Cl.
*A63H 33/32* (2006.01)
*A63H 33/00* (2006.01)
(Continued)

(52) U.S. Cl.
CPC ........... *A63H 33/32* (2013.01); *A63H 33/001* (2013.01); *B28B 7/0014* (2013.01); *B28B 7/0029* (2013.01); *B29C 33/30* (2013.01)

(58) Field of Classification Search
CPC .... A63H 33/32; B28B 7/0014; B28B 7/0029; B28B 2007/005; B29C 33/30;
(Continued)

(56) References Cited

U.S. PATENT DOCUMENTS 1,947,413 A * 2/1934 Hay .......................... E02D 5/60
249/1
4,171,791 A * 10/1979 Britz ......................... B28B 7/16
249/156

(Continued)

FOREIGN PATENT DOCUMENTS

JP 2013108336 6/2013

OTHER PUBLICATIONS

Screenshots of webpages at Can You Dig it Sand Tools (sandtools. com), downloaded Apr. 17, 2018, 5 pages.
(Continued)

*Primary Examiner* — James P Mackey
(74) *Attorney, Agent, or Firm* — Michael D. Downs; Fincham Downs, LLC

(57) ABSTRACT

Systems, methods, and articles of manufacture provide for a mold system for molding structures (e.g., sand castles) from one or more various types of molding substances (e.g., sand, clay, snow). In one embodiment, a mold system comprises a split mold comprising at least two mold sections. In one embodiment, a modular mold system allows for different types of mold sections with corresponding joining elements to be joined together to create forms for molding various types of structures. In some embodiments, mold sections are configured to facilitate the breaking of a vacuum created when molding substances are packed into the mold system, thus making it easier to separate a mold from the formed structure.

13 Claims, 18 Drawing Sheets

Related U.S. Application Data application No. 29/630,909, filed on Dec. 22, 2017, and a continuation-in-part of application No. 29/630,919, filed on Dec. 22, 2017, and a continuation-in-part of application No. 29/630,922, filed on Dec. 22, 2017, and a continuation-in-part of application No. 29/630,914, filed on Dec. 22, 2017, and a continuation-in-part of application No. 29/630,901, filed on Dec. 22, 2017.

(60) Provisional application No. 62/447,496, filed on Jan. 18, 2017.

(51) Int. Cl.
B28B 7/00 (2006.01)
B29C 33/30 (2006.01)

(58) Field of Classification Search
CPC ... B29C 33/303; B29C 33/305; B29C 33/308; E04G 13/02
See application file for complete search history.

(56) References Cited

U.S. PATENT DOCUMENTS

| | | | |
|---|---|---|---|
| 4,847,741 A | 7/1989 | Boettinger | |
| 5,255,888 A * | 10/1993 | Workman | E04G 13/021 249/165 |
| 5,597,593 A * | 1/1997 | Lebensfeld | B29C 33/30 249/105 |
| D384,960 S * | 10/1997 | Kistler | D15/135 |
| 6,126,876 A | 10/2000 | Demarzo | |
| 6,176,464 B1 * | 1/2001 | Harvey | A63H 33/001 249/126 |
| 6,415,926 B1 | 7/2002 | Long | |
| 8,485,493 B2 * | 7/2013 | Wells | E04C 3/34 249/48 |
| 8,544,227 B2 * | 10/2013 | Gullette | E04C 3/34 52/295 |
| 2005/0249835 A1 * | 11/2005 | Racunas, Jr. | A63H 33/32 425/470 |
| 2008/0072510 A1 | 3/2008 | Wells et al. | |
| 2008/0251687 A1 * | 10/2008 | Taufield | A63H 33/32 249/61 |
| 2014/0182226 A1 | 7/2014 | Habodasz | |

OTHER PUBLICATIONS

Screenshots of webpage and product images at https://uedata.amazon.com/PSE-Create-A-Castle-Beach-Builder-Set/dp/B00R4UVCWO, downloaded Apr. 17, 2018, 9 pages.

Written Opinion for PCT/US18/14293 dated May 3, 2018; 10 pps.

International Search Report for PCT/US18/14293 dated May 3, 2018; 4 pps.

* cited by examiner

SYSTEMS, DEVICES, AND METHODS FOR MOLDING STRUCTURES

CROSS-REFERENCE TO RELATED APPLICATIONS

The present application claims the benefit of priority of U.S. Provisional Patent Application No. 62/447,496 filed Jan. 18, 2017, entitled "Castle Mold device," which is incorporated by reference in the present application.

The present application claims the benefit of priority of and is a continuation-in-part of U.S. Design patent application No. 29/630,894 filed Dec. 22, 2017, entitled "Multipurpose Hand Tool," which is incorporated by reference in the present application.

The present application claims the benefit of priority of and is a continuation-in-part of U.S. Design patent application No. 29/630,901 filed Dec. 22, 2017, entitled "Castle Wall Mold," which is incorporated by reference in the present application.

The present application claims the benefit of priority of and is a continuation-in-part of U.S. Design patent application No. 29/630,909 filed Dec. 22, 2017, entitled "Castle Wall Mold," which is incorporated by reference in the present application.

The present application claims the benefit of priority of and is a continuation-in-part of U.S. Design patent application No. 29/630,914 filed Dec. 22, 2017, entitled "Castle Corbel Mold," which is incorporated by reference in the present application.

The present application claims the benefit of priority of and is a continuation-in-part of U.S. Design patent application No. 29/630,919 filed Dec. 22, 2017, entitled "Castle Window Cutter," which is incorporated by reference in the present application.

The present application claims the benefit of priority of and is a continuation-in-part of U.S. Design patent application No. 29/630,922 filed Dec. 22, 2017, entitled "Castle Battlement Mold," which is incorporated by reference in the present application.

COPYRIGHT NOTICE

A portion of the disclosure of this patent document contains material that is subject to copyright protection. The copyright owner has no objection to the facsimile reproduction by anyone of the patent document or the patent disclosure, as it appears in U.S. Patent and Trademark Office patent files or records (or those of other patent offices), but otherwise reserves all copyright rights whatsoever.

FIELD OF THE INVENTION

The present invention relates to systems and methods for creating structures using molding substances.

BACKGROUND

One issue with existing molds for forming structures of molding substances (e.g., sand, snow, clay, wax) is that a vacuum may be created inside of the mold, making it difficult to separate the mold from the molded structure. Packing or otherwise compacting a molding substance in the mold is often desirable for creating a sturdier structure, but removing more air from the molding substance in this way increases the potential for creating a vacuum in the mold. In some cases, the created vacuum may be strong enough to resist removal of the mold from the structure (or vice versa), and in some cases the vacuum may even retain at least some of the molding substance in or on the mold during separation, or may otherwise cause the structure to break or lose structural integrity when separated from the mold.

This vacuum issue exists even with molds configured to be removed vertically, when gravity is available to act against the vacuum and assist in the separation process. For example, a created vacuum may still be strong enough to break a structure when a user attempts to remove a mold vertically (e.g., lifting an inverted concave mold off a sand castle). If the vacuum is strong enough, there is also the potential issue that when a user lifts a mold to remove it, she will lift the entire structure (i.e., still in the mold) from its intended place, creating a risk that the structure will separate above a surface, drop, and break on impact. Another issue with some types of vertically-removed molds (e.g., "fill-and-flip molds") is that it is difficult to lift such molds without hitting and damaging the structure just created. A mold designed to be removed vertically is limited to forms that generally taper upward and do not have higher structural elements that are farther from a central axis than lower structural elements.

BRIEF DESCRIPTION OF THE DRAWINGS

An understanding of embodiments described in this disclosure and many of the related advantages may be readily obtained by reference to the following detailed description when considered with the accompanying drawings, of which.

DETAILED DESCRIPTION

A. Introduction

Figure 1:
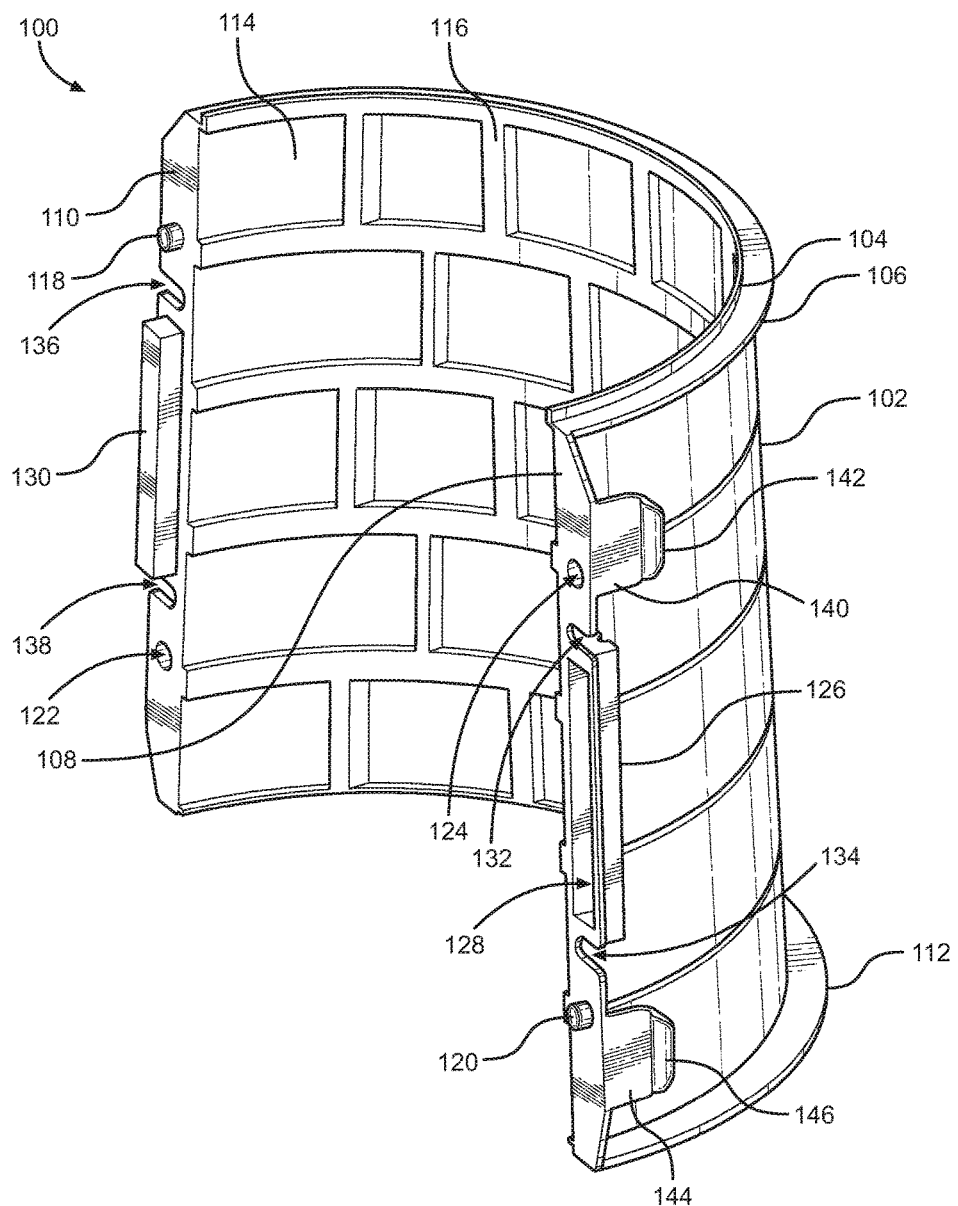
FIG. 1 is a diagram of a mold section of a mold system according to an embodiment of the present invention.

So that the manner in which the features and advantages of the embodiments of products and methods may be understood in more detail, a more particular description of the embodiments of products and methods may be had by reference to the drawings, which form a part of this specification. It is to be noted, however, that the drawings illustrate only various embodiments of the embodiments of products and methods of the present invention and are therefore not to be considered limiting of the embodiments of products and methods of the present invention's scope as it may include other effective embodiments as well. Like numbers refer to like elements throughout. Further, numbers that have common ones and tens digits with different hundreds or thousands digits are intended to indicate similar elements in alternative embodiments.

The inventor for this application has recognized that, in accordance with some embodiments described in this disclosure, it is advantageous to provide systems, articles of manufacture, and methods providing for one or more of the following features: (1) a mold (or form) that may be packed (e.g., by a user, by an automated machine process) with the desired amount and/or density of molding substance; (2) breaking of any vacuum resulting from packing molding substance into a mold, thereby facilitating separation of the mold from the structure; (3) the combination of two or more molds to allow for larger, combination structures; (4) a mold system comprising a base mold and an edge mold configured to form structures on top of the base molds.

As described in this disclosure, various embodiments may be used with any molding substance, material, or composition, including but not limited to sand and snow, that may be suitable for forming desired structures (e.g., sand castle sculptures).

According to some embodiments a mold system is provided that includes two or more mold sections configured for use with one another to form a complete mold that is configured to form a structure or object dictated by the design of the combined mold sections (e.g., having a structure of desired shape, height, ornamental design, etc.). When the sections are combined or connected (e.g., to receive the molding substance) using one or more connection points, they may be packed with as much molding substance (e.g., sand, sand with water, snow, and/or other substance), as desired by the user for the intended purpose. According to some embodiments, two or more complete molds may be combined to create combination structures.

In one or more embodiments, at least one connection point of the mold system at which the mold sections are detachably connectable to one another is further configured for breaking a vacuum to facilitate separation of the mold from the formed structure. In one example, the connection point may be configured to receive and/or to be manipulated by a separate or attached device to break the vacuum.

According to some embodiments, a mold section may comprise one or more tabs, handles, or protrusions for gripping the mold section when separating the mold section from the formed structure.

According to some embodiments, a mold system may comprise a first set of mold sections configured to be connected to one another to form a first complete mold, and a second set of mold sections configured to be connected to one another to form a second complete mold. The first complete mold and the second complete mold are further configured so that the second complete mold may be placed on top of the first complete mold to create a combination of both molds and/or for creating a combination structure. For example, a second complete mold may be formed (e.g., by attaching its multiple sections together) and fit in place on or otherwise combined with the first complete mold.

In some embodiments, a user could couple two complete molds together by joining a flange of the first complete mold (e.g., a flange at the top of the first complete mold; or, if combining molds side by side, a flange on one side of the first complete mold) to a flange of the second complete mold, thus effectively creating a combined mold for forming a larger structure. The combination of multiple complete molds could comprise, for example two or more stacked molds (e.g., to create a taller tower feature) and/or two or more molds combined by placing them next to one another (e.g., to create a longer and/or wider structure). In some embodiments, ridges along the top of one mold may be configured to fit within or around the ridges along the bottom of another mold to secure the molds together. According to some embodiments, the first complete mold and the second complete mold, and/or individual mold sections of the respective complete molds, may be secured together (e.g., using a securing system such as a latch or buckle to combine the complete molds or mold sections thereof).

This combination of separate molds is not possible with traditional fill-and-flip or container-type molds (e.g., a traditional sand pail) in which sand, for example, is placed in a mold container having a solid, bottom container wall, and then the mold container is inverted to form a structure on a surface. There is no way to remove a first container-type mold after a second mold (of any type) is placed on top of it—the second structure would be built on top of the bottom container wall that is now the top surface of the inverted mold container.

In contrast, as noted above, some embodiments of the present invention provide for mold system having separable mold sections providing advantages over traditional, container-type molds. Various embodiments of mold systems are described in this disclosure such that when two or more mold sections are combined to form a complete mold, the complete mold has at least one exposed opening. For example, two mold sections may be combined to create a tower mold having a bottom opening that will be placed on the building surface (e.g., a beach surface, a worktable, etc.), and an upper opening that may be used for filling the mold with the desired molding substance.

In accordance with some embodiments, a first complete mold may be configured to be joined with a second complete mold at the upper opening of the first complete mold. For example, a bottom opening of the second (upper) complete mold may be joined with the upper opening of the first (bottom) complete mold to create, effectively, a single combined mold that allows all the inserted molding substance to be packed together, which may allow for denser packing and/or stronger formed structures. Such a configuration also allows advantageously for molding of an upper portion of a combination structure by filling the second complete mold, while the first (bottom) complete mold is still in place. Alternatively, the first (bottom) complete mold may be configured to be removable before the upper portion is completed, as desired.

In either case, the upper portion is structurally integrated with the bottom portion of the combination structure by effectively packing additional molding substance directly on top of the molding substance at the top of the first (bottom) complete mold, through the lower opening of the second (upper) complete mold that is joined with the upper opening of the first (bottom) complete mold. Once the upper structure portion is molded, the second complete mold may be removed (e.g., by unbuckling and separating two halves of the second (upper) complete mold). Finally, if not removed previously, the first (bottom) complete mold may be disassembled and separated from the bottom part of the structure, leaving a free-standing combination structure.

In one example, as described in this disclosure, a first complete mold may be formed of two halves of a first cylindrical mold that is not closed on the top, allowing for the creation of a first column structure with an exposed top surface (e.g., the bottom section of a sand castle tower). A second complete mold may then be used to form a second structure on top of the exposed top surface of the first column structure (e.g., an upper section of the example sand castle tower). As noted above, the second complete mold may be but need not necessarily be joined to the first complete mold.

In some embodiments, the two or more mold sections of the mold system are configured to be completely separable from one another and to be connected to one another (i.e., to be detachably connectable to one another) to form a complete mold. In some embodiments, a split-mold system may comprise two separable sections that may be stably connected to one another using one or more types of slots or holes, with corresponding connective elements (e.g., snap joints with corresponding male and female elements). In some embodiments, the split-mold system comprises two separable sections that may be more robustly secured to one another using, for example and without limitation, a latch, a snap joint, buckle, hook-and-eye closure, elastic bands, nut and bolt, a clip, a cotter pin, a clamp, or other securing system for securely connecting the sections to each other, to create a complete mold. A split-mold system is advantageous, in accordance with some embodiments, for making transportation and/or storage of the mold system easier than with traditional, single-piece molds. For instance, because each separable section is smaller than the complete mold it forms, it is easier to store the sections of a split-mold system individually, nested together, and/or stacked on one another for transportation and/or storage.

In some embodiments, the two or more mold sections of the mold system may be permanently attached to one another via at least one connection point (e.g., by a living hinge) and are configured to be detachably connectable to one another at another connection point (e.g., using one or more of the connecting and/or securing systems, as noted above).

In one or more embodiments, a point of connection, at which two mold sections are detachably connectable, may be further configured to receive or to be manipulated by a device for breaking a vacuum to facilitate separation of the mold from the formed structure.

According to some embodiments, a castle-mold system is provided that includes two or more sections that can be combined to form the molding shape, that can be packed with as much sand, water, snow (or other substance), as needed. A latch or buckle system is provided to hold the mold sections in place and to create a mold.

In accordance with some embodiments of the present invention, a separation tool is provided that comprises one or more of:

a) a blade, the blade comprising a leading edge configured to be inserted between and to separate mold sections of a multi-section mold;
   b) a handle connected to the blade; and/or
   c) a scoop connected to or integrated with the handle.

According to some embodiments, one or more systems and articles of manufacture are provided that comprise a device configured to break a vacuum of a mold but still allows the mold to be packed as needed with the required amount of molding substance to generate a clean sculpture. In one embodiment, the device comprises a blade or thin wedge configured with a leading edge for inserting between two mold sections. In one embodiment, the device is configured such that when inserted between the mold sections and rotated relative to the plane of insertion, the rotation separates the mold sections, allowing air to enter the mold and break the vacuum. According to some embodiments, the device for breaking the vacuum may be comprised of any suitable solid material, such as plastic, metal, or wood, of sufficient rigidity to separate the mold sections when inserted between them and/or rotated between them. According to some embodiments, the device may comprise a handle for a user to hold while inserting the blade between the mold sections. According to some embodiments, the device may comprise a scoop or other type of shaping and/or removal tool configured for shaping, decorating, and/or removing molding substance from structures (e.g., for decorative purposes).

In accordance with some embodiments of the present invention, an article of manufacture is provided comprising a cutter tool for shaping and/or removing molding substance from a formed structure. In one embodiment, the cutter tool comprises a handle for holding the cutter, a cutting edge for inserting into the formed structure, and an opening for allowing the molding substance to pass through the opening of the cutter tool when the cutting edge is inserted into the molding substance.

In accordance with some embodiments of the present invention, an article of manufacture is provided comprising an edge mold configured to align with a top edge of a second mold. In one or more embodiments, the edge mold is configured with a guide (e.g., a ridge) that matches (e.g., has a curvature similar to) and may be aligned against a second guide or ridge along the top, outer perimeter of the second mold. In one embodiment, the edge mold comprises a handle for holding the edge mold, a ridge for aligning the edge mold against a corresponding ridge of a second mold, a first opening for filling the edge mold, and a second opening configured to allow molding substance in the edge mold to form on the surface of an underlying structure formed in the second mold. In one example, the edge mold may be used to form one or more structures along the outer perimeter of a base structure (e.g., battlement blocks on the top of a sand castle tower).

According to some embodiments, a kit for forming structures from molding substance is provided, the kit comprising one or more of the following features:

a) a first mold section defining a first shape;
   b) a second mold section defining a second shape;
   c) the first mold section comprising a first joining component for joining the first mold section to a corresponding second joining component of the second mold section to form a complete mold for containing molding substance to form a structure defined by the first shape and the second shape,
   d) the complete mold having an opening for filling the complete mold with molding substance, e) the complete mold having an insertion space, between the first mold section and the second mold section, configured for receiving a tool for disassembling the first mold section from the second mold section; and f) a securing device for securing the first mold section to the second mold section when the first mold section is joined to the second mold section.

According to some embodiments, one or more systems and articles of manufacture for forming structures with molding substances comprise one or more of the following:

a) two or more mold sections configured to be connected to one another to form a mold;

b) one or more securing devices for securing the two or more mold sections to one another (wherein the securing devices may be separable from the mold sections or may be integrated with the mold sections); and/or c) a separation tool (e.g., a hand tool with a blade) configured to break a vacuum created when forming a structure with the mold formed by the two or more mold sections.

According to some embodiments, a mold system is provided, the mold system comprising:

a) a first reversible and stackable mold device defining a first structure shape;

b) a second reversible and stackable mold device defining a second structure shape, c) wherein the second reversible and stackable mold device is configured to be stacked on top of the first reversible and stackable mold device in a plurality of combination mold configurations, each combination mold configuration defining a respective combination structure shape comprising the first structure shape and the second structure shape.

According to some embodiments, a kit is provided for forming structures of sand or other molding substance, the kit comprising:

a) a first mold section of a split-mold system;

b) a second mold section of the split-mold system, configured to be connected to the first mold section to form a mold, wherein when the first mold section is connected to the second mold section they form a slot for receiving a device for breaking a vacuum in the mold;

c) at least one securing device (e.g., a buckle) for securing the first mold section to the second mold section when they are connected; and d) a separation tool with a blade configured to be inserted in the slot formed by connecting the first mold section to the second mold section to break a vacuum created when forming a structure with the mold.

According to some embodiments, a kit comprising multiple mold systems is provided for forming structures of sand or other molding substance, the kit comprising:

a) a first mold system for forming a first structure; and b) a second mold system for forming a second structure, wherein the first split-mold system and the second split-mold system are configured so that the second split-mold system may be coupled with the first split-mold system to create a combination of the first structure and the second structure;

c) a plurality of securing devices (e.g., buckles) for securing respective mold sections of the respective mold systems together; and d) a separation tool with a blade configured to be inserted in slots formed in the split-mold systems to break a vacuum created when forming structures using the split-mold systems.

According to some embodiments, a modular mold system is provided comprising:

a) a first mold device having a first opening (e.g., defined by a first opening flange) and a second opening (e.g., opposite the first opening), the first mold device defining a first structure shape;

b) a second mold device having a third opening and a fourth opening, the second mold device defining a second structure shape, c) wherein the second mold device is configured to be combined with the first mold device (e.g., placed on top of or side by side with) such that the third opening is aligned with the first opening, to assemble a first combination mold device defining a first combination structure shape, wherein the first combination mold device is fillable using the fourth opening of the second mold device, and d) wherein the second mold device further is configured to combined with the first mold device such that the fourth opening is aligned with the second opening, to assemble a second combination mold device defining a second combination structure shape, wherein the second combination mold device is fillable using the third opening of the second mold device.

One or more embodiments provide for a mold system for forming a structure from a molding substance, the mold system comprising:

e) a first mold section defining a first shape, and comprising at least one vertical flange, each vertical flange comprising a joining component and a separation tab;

f) a second mold section defining a second shape, and comprising at least one vertical flange, each vertical flange comprising a joining component and a separation tab;

g) wherein the first mold section and the second mold section are configured to be joined together.

In some embodiments, a joining component of one vertical flange of the first mold section is configured to connect to a joining component of another vertical flange of the second mold section, in such a way that a separation tab on the one vertical flange is aligned opposite the separation tab on the other vertical flange. In this way, one or more sets of opposing separation tabs, each separation tab being on its respective vertical flange, may be manipulated (e.g., by a user using her hands to hold on to both) to separate the mold sections from each other after they are joined. The advantage of the tabs may allow a user to remove the multiple mold sections from a formed structure more easily and without damaging the structure.

In accordance with some embodiments, any kits or systems described in this disclosure may comprise one or more of:

a) a container (e.g., a bag or box) for storing and/or transporting the components of a mold system;

b) a cutter tool; and/or c) an edge mold.

B. Terms and Definitions

Throughout the description that follows and unless otherwise specified, the following terms may include and/or encompass the example meanings provided in this section. These terms and illustrative example meanings are provided to clarify the language selected to describe embodiments both in the specification and in the appended claims, and accordingly, are not intended to be limiting.

"Molding substance" refers to materials and/or compositions such as snow, sand (preferably but not necessarily mixed with water or other liquid), soil, clay, modeling compound, wax, and/or other materials, which may be molded or otherwise shaped to form structures, sculptures, and other objects (e.g., sand castles of beach sand, blocks of snow, wax figures). In some instances, molding substances may be compactible, such as sand or snow, and preferably are packed or pressed into a mold to form denser or stronger structures. To provide some illustrative and non-limiting examples, reference may be made in this disclosure to sand castles and sand castle structures (e.g., structures of sand that include and/or evoke features of castles, towers, walls, and the like). It will be readily understood, however, in light of this disclosure, that unless explicitly stated otherwise, no embodiment is intended to be limited to use for creating structures of sand or structures resembling castles.

C. Systems, Articles of Manufacture, and Methods

FIGS. 1-4 show examples of components of a mold system in accordance with some embodiments of the present invention. An example mold section 100 of a mold system is depicted in FIG. 1, in accordance with one embodiment. The mold section 100 comprises an outer surface 102, a joining ridge 104, and an upper flange 106. In some embodiments, as described in this disclosure, another mold section and/or another mold system may be joined with the section 100 by stacking the bottom of the other mold system on top of the flange 106 such that the joining ridge 104 is inserted into the bottom opening of the other mold system. (For purposes of illustration, some examples may refer to stacking one mold section or mold device on another, but it will be readily understood that combination of molds in accordance with some embodiments may be achieved by joining multiple molds in ways that may not include stacking, and/or may include joining molds side by side.) The joining ridge 104 may be nearer the outer or inner perimeter of the top of mold section 100; another joining ridge (not shown) may be nearer the outer or inner perimeter of the bottom of mold section 100. As noted above, this allows for two mold systems (e.g., of the same size and shape) to be stacked and interlocked to create taller, combination molds. For example, the ridges along the top of one mold system may be configured to fit within or around the ridges along the bottom of another mold system to lock the devices together. In accordance with other embodiments, one or more of a set of stacked mold systems may not have a ridge (e.g., one mold system may be placed on another such that openings of like size and/or shape are aligned). Some additional examples of stacked configurations of molds (including different mold devices) are discussed below with respect to FIGS. 12 and 13.

In accordance with some embodiments, the mold section 100 further comprises vertical flanges 108 and 110, and bottom flange 112. Vertical flanges 108 and 110 are configured to align with corresponding flanges on another mold section (not shown). As depicted in the example in FIG. 1, vertical flange 108 may be configured, in one embodiment, with one or more joining elements 120, 124, and 128 for connecting the vertical flange 108 with a corresponding flange of a different mold section (e.g., to create a complete mold). Similarly, vertical flange 110 may be configured with one or more joining elements 118, 122, and 130 for connecting the vertical flange 110 with a corresponding flange of a different mold section.

The example peg- or post-type joining elements 118 and 120, for example, may be configured to align with and be inserted into corresponding hole-type joining elements (not shown) on one or more other mold sections in order to connect the other mold section(s) with mold section 100. The example hole-type joining elements 122 and 124, for example, may be configured to align with and receive corresponding peg-type joining elements (not shown) on one or more other mold sections to connect the other mold section(s) with mold section 100. Although they are depicted in FIG. 1 as being substantially circular, peg-type joining elements may be configured in a variety of different shapes and lengths (depths).

Although three different types are illustrated in the example mold section 100 in FIG. 1, it will be understood that any number and/or type of joining elements may be used, as deemed desirable for a particular implementation, based on the length and/or width of the vertical flanges being used, etc. Joining elements may also be of any size and/or shape deemed desirable for a particular implementation. The example joining element 126 depicted in FIG. 1, for example, is configured as a rectangular female joining element for receiving and securing a corresponding rectangular male joining element (not shown) into the pocket 128. In another example, joining element 130 is configured as a rectangular male joining element for inserting into a corresponding rectangular female joining element of another mold section (not shown). The respective lengths of joining elements 126 and 130, relative to the vertical length of the flanges 108 and 110, may be, in accordance with some embodiments, more desirable than a shorter length. The longer length may provide greater stability and a stronger connection between the vertical flanges 108 and 110 and corresponding flanges of a different mold section or sections (not shown).

Vertical flanges 108 and 110 comprise gaps or slots 132, 134 and 136, 138, respectively. In accordance with some embodiments, vertical flanges 108 and 110 of mold section 100 may be secured to flanges of one or more other mold sections using one or more securing devices (not shown), such as buckles and/or latches. As discussed in more detail below, slots 132, 134, 136, and 138 may be configured to hold components (e.g., locking bars) of such securing devices in place.

In accordance with one or more embodiments, vertical flange 108 may comprise one or more tabs 140, 144 having grip portions 142, 146, respectively. As depicted, tabs 140 and 144 are connected to and are perpendicular to the vertical flange 108, but the relative orientation may be at any angle such that the distance between the tabs 140 and 144 and the surface 102 is sufficient for a user to get a finger behind the tabs 140 and 144 to grip them. Grip portions 142 and 146 are configured to provide a thicker portion of the tabs 140 and 144 that a user may grip more easily (e.g., with a thumb on the outer surface of tab 140 and one or more fingers between tab 140 and the surface 102).

Tabs 140 and 144, in accordance with some embodiments, are configured to assist a user in removing the mold section 100 from a formed structure (e.g., sand castle). In one example, a user, after breaking any vacuum in the complete mold that includes mold section 100 in order make removal of mold sections easier, can hold a tab 140 on the one side of mold section 100 with one hand, can hold another tab (not shown) on the other side of mold section 100 with the other hand, and pull the mold section 100 substantially perpendicularly relative to the longitudinal axis of the formed structure—substantially straight out away from the outer face of the structure. The number, orientation relative to the vertical flange 108, shape, and/or size of tabs 140 and 144 may vary in different embodiments, as deemed desirable for a particular implementation.

Example mold section 100 is configured using a particular pattern of mold elements 114 and 116 suitable for providing a structure resembling a castle tower with protruding brick elements (see, e.g., FIG. 6C, discussed below). Mold section 100 is also depicted in FIG. 1 as a column or cylinder generally tapering upward. However, because mold section 100 is configured to be pulled, in general, away from the center of the formed structure, it will be readily understood by those skilled in the art that a completed mold may comprise various types of designs and/or be used to make structures with a variety of different shapes, including shapes that may be wider than or have upper elements that protrude farther from center than base or lower elements.

Figure 2:
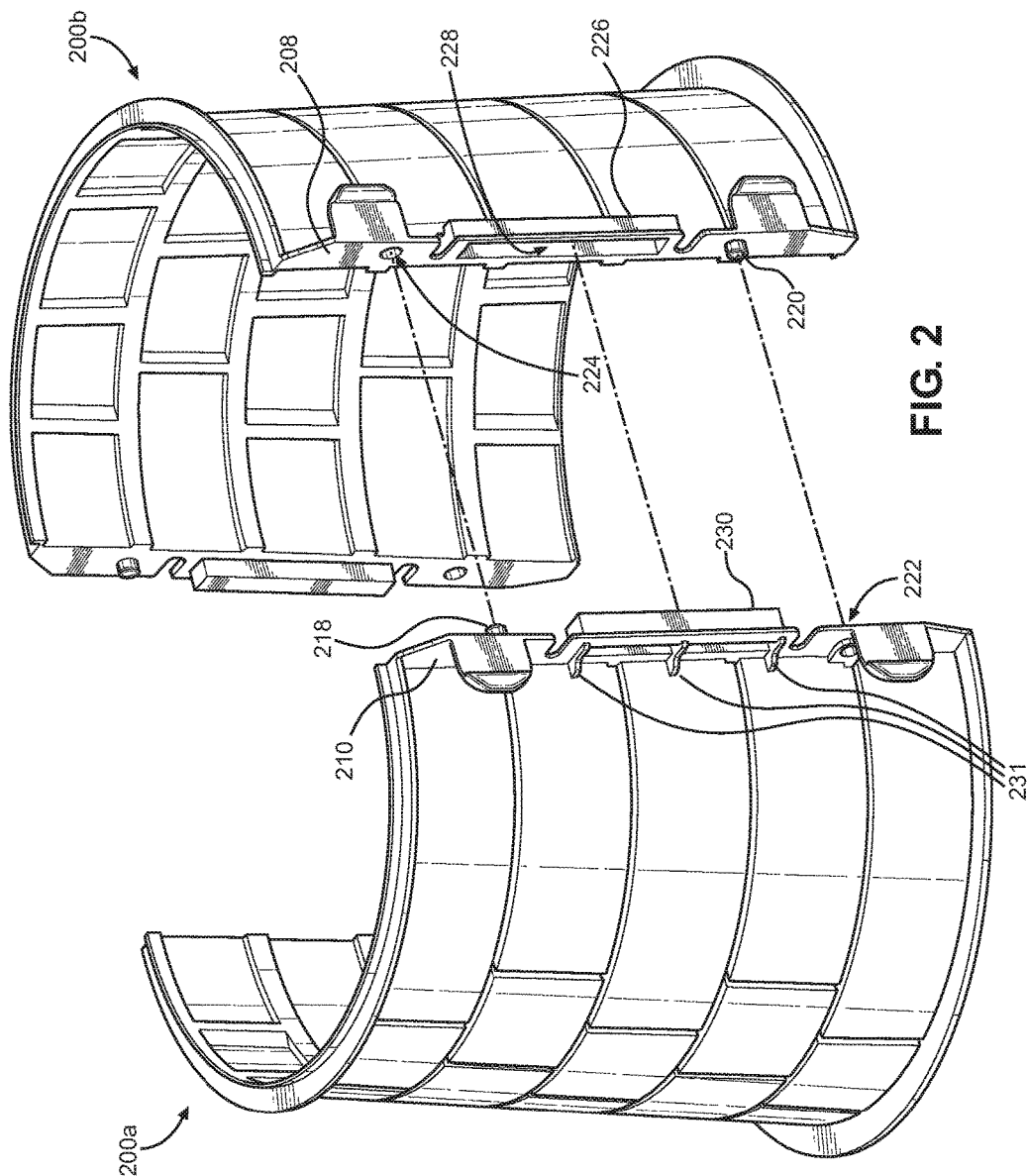
FIG. 2 is a diagram of a mold system having two mold sections according to an embodiment of the present invention.

FIG. 2 shows an example mold system comprising two mold section 200a and 200b. As shown, mold sections 200a and 200b are identical, and each represents half of the shape to be molded. According to the example, each of the two mold sections 200a, 200b represents a half cylinder and the two mold sections 200a and 200b may be combined to form a full cylinder mold.

In particular, vertical flange 208 of example mold section 200b is designed to be connected to vertical flange 210 of mold section 200a by inserting peg-type joining element 218 into hole joining element 224, inserting male joining element 230 into the pocket 228 of female joining element 226, and by inserting peg-type joining element 220 into hole joining element 222 (not visible), as shown. Similar elements may be used with the other vertical flanges to secure the other side of the mold system.

According to one embodiment, the two mold sections 200a, 200b comprises joining components 230 and 226. Joining component 226 overlaps component 230, and joining component 230 fits into joining component 226 when the two mold sections 200a, 200b are assembled together. In accordance with some embodiments, the joining component 228 may comprise a securing device support member, configured to support a securing device (not shown) when the two mold sections 200a, 200b are assembled.

In some embodiments, male joining element 230 may be configured with one or more supporting flanges 231 that provide support to male joining element 230 (e.g., by providing additional rigidity to the male joining element 230 so that it is less prone to bending when joined) and/or that may be configured to help attach a securing device (not shown) for securing the mold sections 200a, 200b together.

It will be readily understood in light of the present disclosure, however, that mold sections 200a and 200b do not need to be identical. For example, while the vertical flanges should correspond to ensure proper alignment and joining, mold section 200b does not have to be the same shape as 200a. For instance, so long as its shape is configured such that the vertical flanges may be joined together, either one or both of mold sections 200a, 200b could have a shape that is irregular, rectangular, pentagonal, etc. In accordance with some embodiments, a modular mold system may include a plurality of mix-and-match modular mold devices and/or modular mold sections for forming respective shapes and/patterns, each modular mold section or modular mold device being configured to be connectable to one or more other mold sections and/or mold device for creating a variety of structures (e.g., a half-cylindrical mold section may be combined with either a half-square mold section or an irregularly-shaped mold section).

When the two mold sections 200a, 200b are attached, it will be understood that a receptacle or interior space is formed between them. During use of the completed mold, a molding substance may be packed into the receptacle. For example, sand or snow may be dropped or shoveled into the receptacle space formed by the completed mold.

Figure 3:
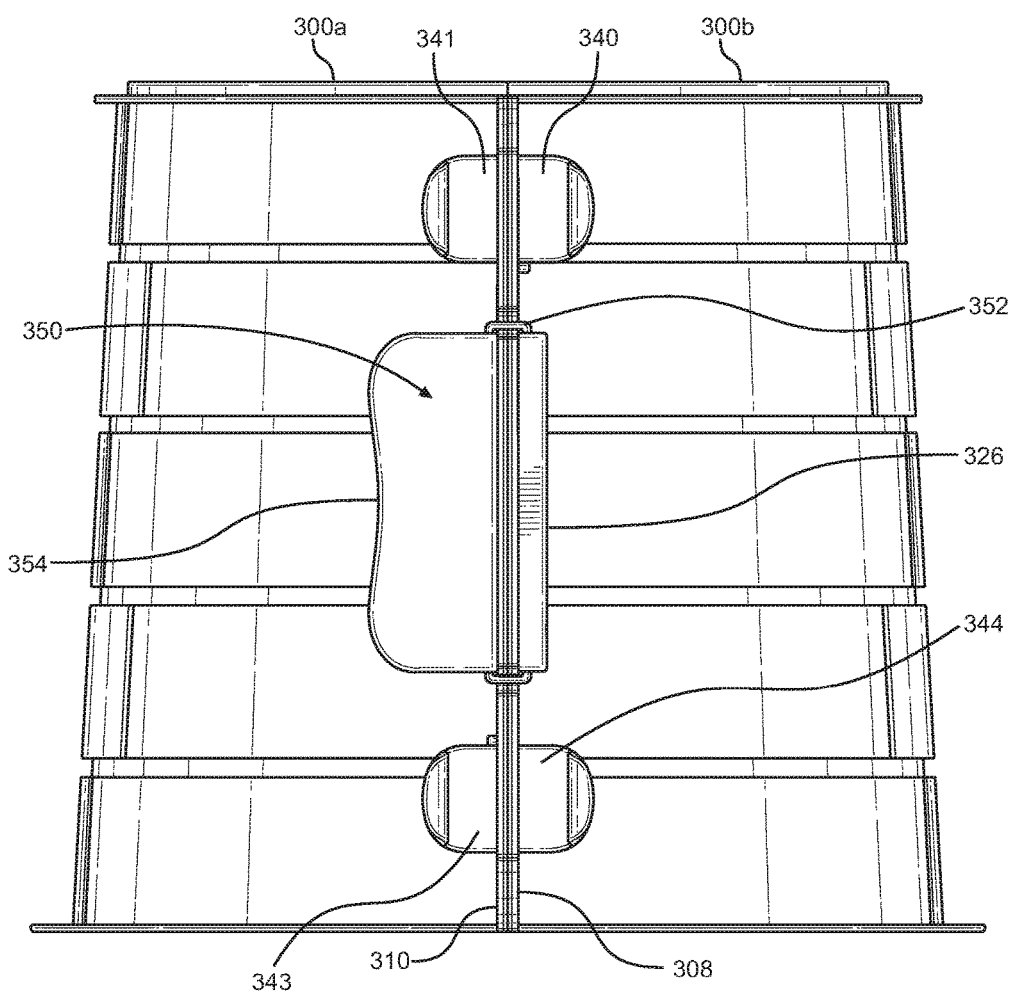
FIG. 3 is a diagram of a mold system according to an embodiment of the present invention.

FIG. 3 shows a mold system, in accordance with some embodiments, in which two mold sections 300a, 300b may be secured together using a buckle 350 and/or other type of securing device. As shown in FIG. 3, the example buckle 350 comprises a locking bar 352 attached to a locking plate 354. The locking plate 354 may include, for example, a slot (not shown) into which a portion of the locking bar 352 is inserted to secure the two elements of the buckle 350 together.

According to one embodiment, the buckle 350 may be affixed to one of the two mold sections 300a, 300b, to avoid the risk of the buckle 350 being detached from the mold device and lost. For example, the locking plate 354 could be attached to section 300a. In some alternative embodiments, the buckle 350 may be a separate component that is removable from both of mold sections 300a, 300b.

According to some embodiments, the locking bar 352 may rest on a surface of a buckle support member 326. In one embodiment, the buckle support member 326 may comprise a slot (not shown) dimensioned to receive the locking bar 352.

Accordingly, to lock the buckle 350, the locking bar 352 may be placed over the buckle support member 326 (e.g., using a slot and/or one or more gaps in the vertical flanges 308, 310). For example, the locking bar 352 may be lodged in a slot of the buckle support member 326 and also in gaps in the vertical flanges 308, 310, above and below the buckle support member 326. The locking plate 354 through which the locking bar 352 passes may then be rotated around the locking bar 352 by pushing it toward the mold device to secure the two mold sections 300a, 300b of the completed mold together.

The buckle 350 may be configured such that when the locking plate 354 is rotated and pressed substantially flush against the outer surface of the mold section 300a, the two portions of the vertical flanges 300a and 300b between the rightmost edge of the locking plate 354 (as shown) and the locking bar 352 fit against each other snugly, pressed against each other and between the locking plate 354 and the locking bar 352. A secure fit may be accomplished by the buckle 350 while still allowing for easy removal by, for example, having the portion of the locking plate 354 that sits between the locking bar 352 on the left-hand side and the vertical flange 310, as shown in FIG. 3, be wider when the locking plate 354 is flush against the mold section 300a than it is when the locking plate 354 is not flush against the mold section 300a. In this way, rotating the locking plate 354 to the secure position locks the two portions of vertical flange 308 and 310 together, while rotating the locking plate more towards perpendicular to the outer mold surface (the release position) increases the space between the locking plate 354 and the locking bar 352 on the right-hand side. In one embodiment, to unlock the buckle 350, the locking plate 354 may be lifted away from the mold section 300a, which causes the locking bar 352 to disengage from the buckle support member 326. The two sections 300a, 300b may then be detached from each other.

Figure 4:
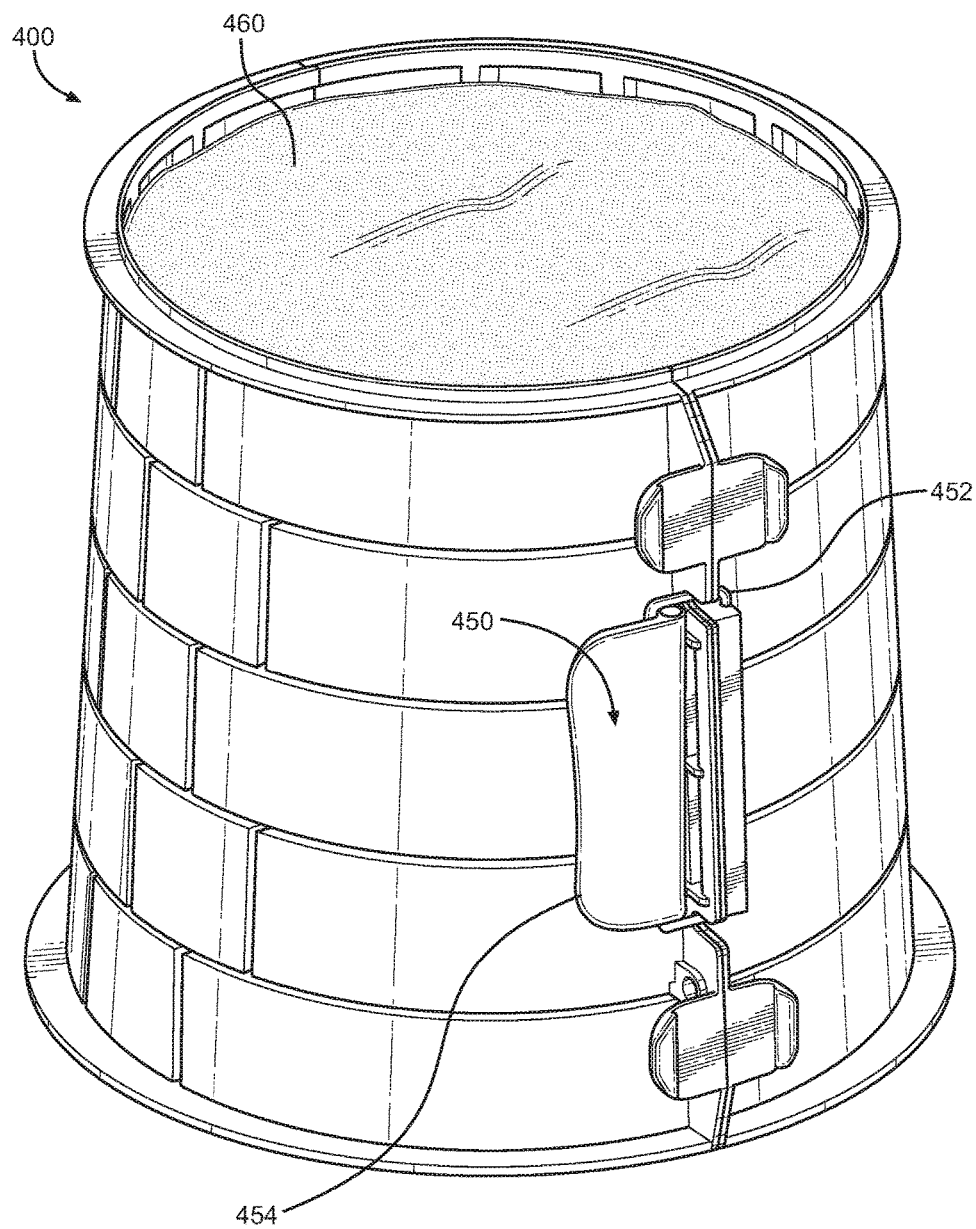
FIG. 4 is a diagram of a mold system according to an embodiment of the present invention.

As discussed in this disclosure, once a complete mold is formed, such as by example mold sections 300a, 300b, a molding substance may be packed into the assembled mold, and then the two mold sections 300a, 300b can be disassembled (e.g., by releasing the tension on the buckle 350) without risking damage to the formed structure within the mold. FIG. 4 provides an example of an assembled mold system 400 with two mold sections securely connected to one another by a buckle 450 comprising a locking plate 454 and a locking bar 452. As depicted in FIG. 4, the mold system 400 has been almost filled with a molding substance.

As discussed in this disclosure, joining components described with respect to some embodiments for a mold system may include projections, indentations, and/or other types of joining components which are configured to fit together with projections, indentations, and/or other types of joining components on the opposing vertical flange to provide a further mechanism for securing two or more mold sections together. An assembled mold system may include one securing mechanism (e.g., a single buckle) or may include two securing mechanisms (e.g., two buckles on opposing sides of the assembled mold system). In embodiments of the device 100 that are formed by more than two mold sections, more than two buckles can be provided.

Additionally, in certain embodiments, extensions of the vertical flanges may be included on opposing sides of an assembled complete mold; or alternatively, the completed mold may be formed without either extensions or tabs formed along the height of each mold section, wherein only a support member (e.g., buckle support member 326) may be provided for supporting a securing device (e.g., buckle 350).

Figure 5:
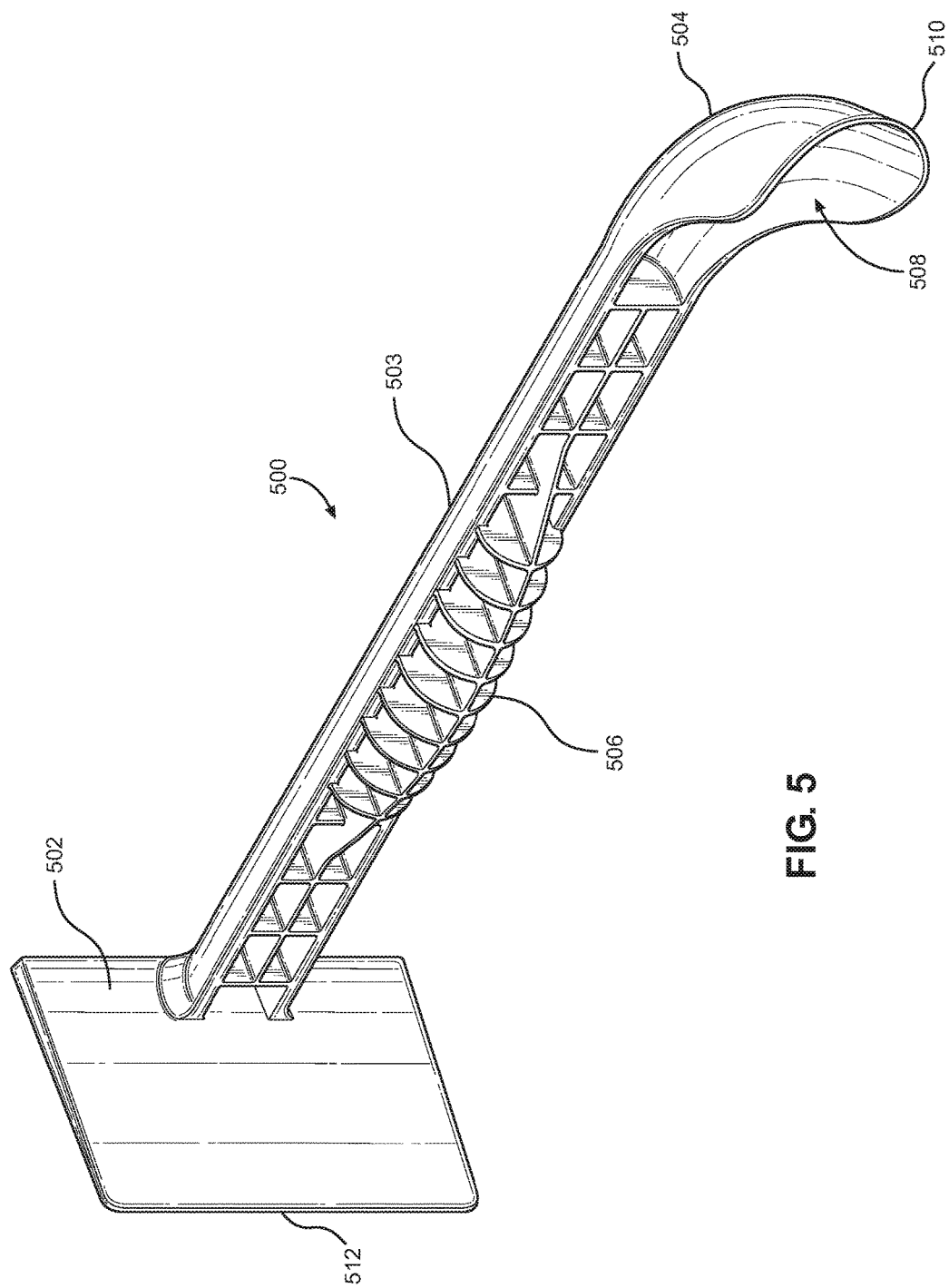
FIG. 5 is a diagram of a separation tool according to an embodiment of the present invention.

FIG. 5 shows a perspective view of a multi-purpose hand tool 500 for use as a separation tool with a mold system. The hand tool 500 comprises a flat head or blade 502 comprising an edge 512. The blade 502 may be substantially wedge-shaped, as depicted in FIG. 5. The blade 502 may be useful, in accordance with some embodiments, for tamping or packing down sand or snow in a mold and/or for scraping away or collecting molding substance. In addition to uses for shaping a molded structure, the edge 512 may be used, in accordance with some embodiments, for breaking the vacuum in a mold packed with molding substance (see, e.g., FIGS. 6A and 6B).

The multi-purpose hand tool 500 may further comprise a handle 503, a grip 506, and a scoop portion 504 comprising a scooping edge 510 and a concave or hollow portion 508 for scooping or otherwise removing molding substance from a formed structure.

Figure 6A:
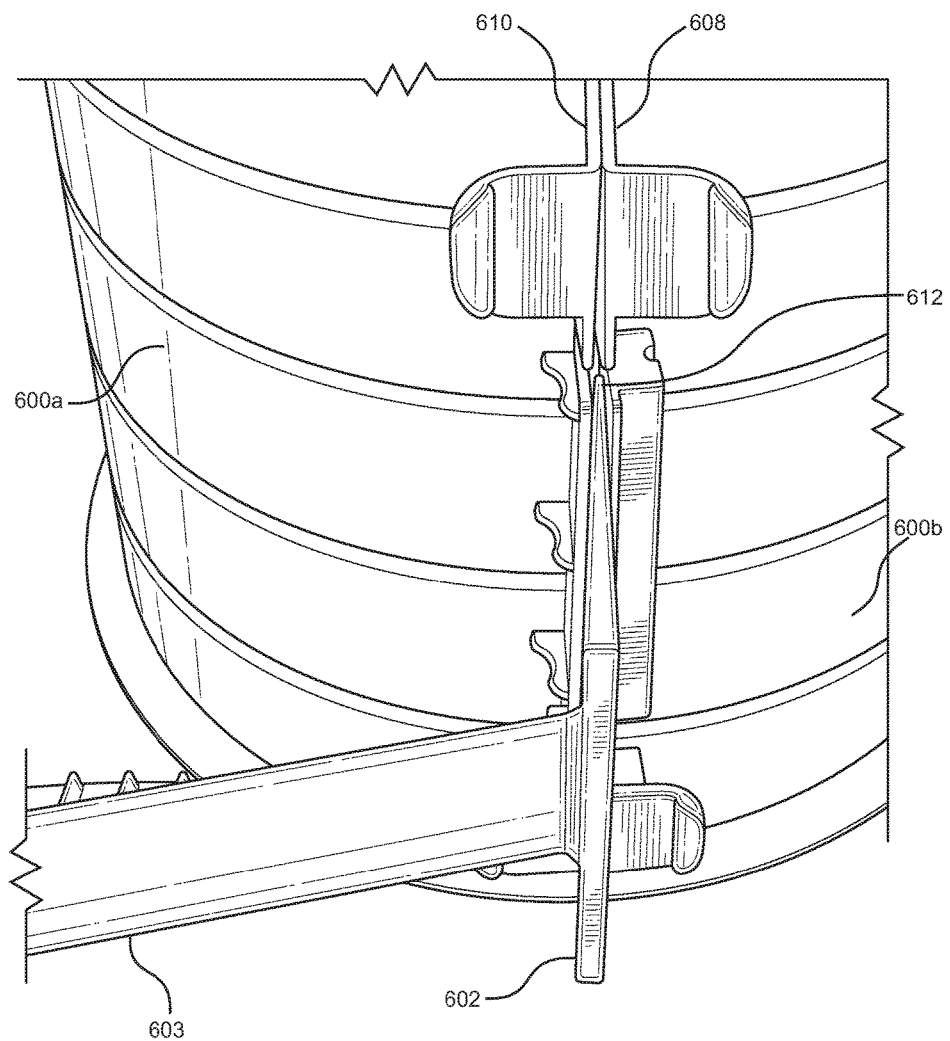
FIG. 6A is a diagram of a use of a separation tool of a mold system for separating mold sections of the mold system according to an embodiment of the present invention.
Figure 6B:
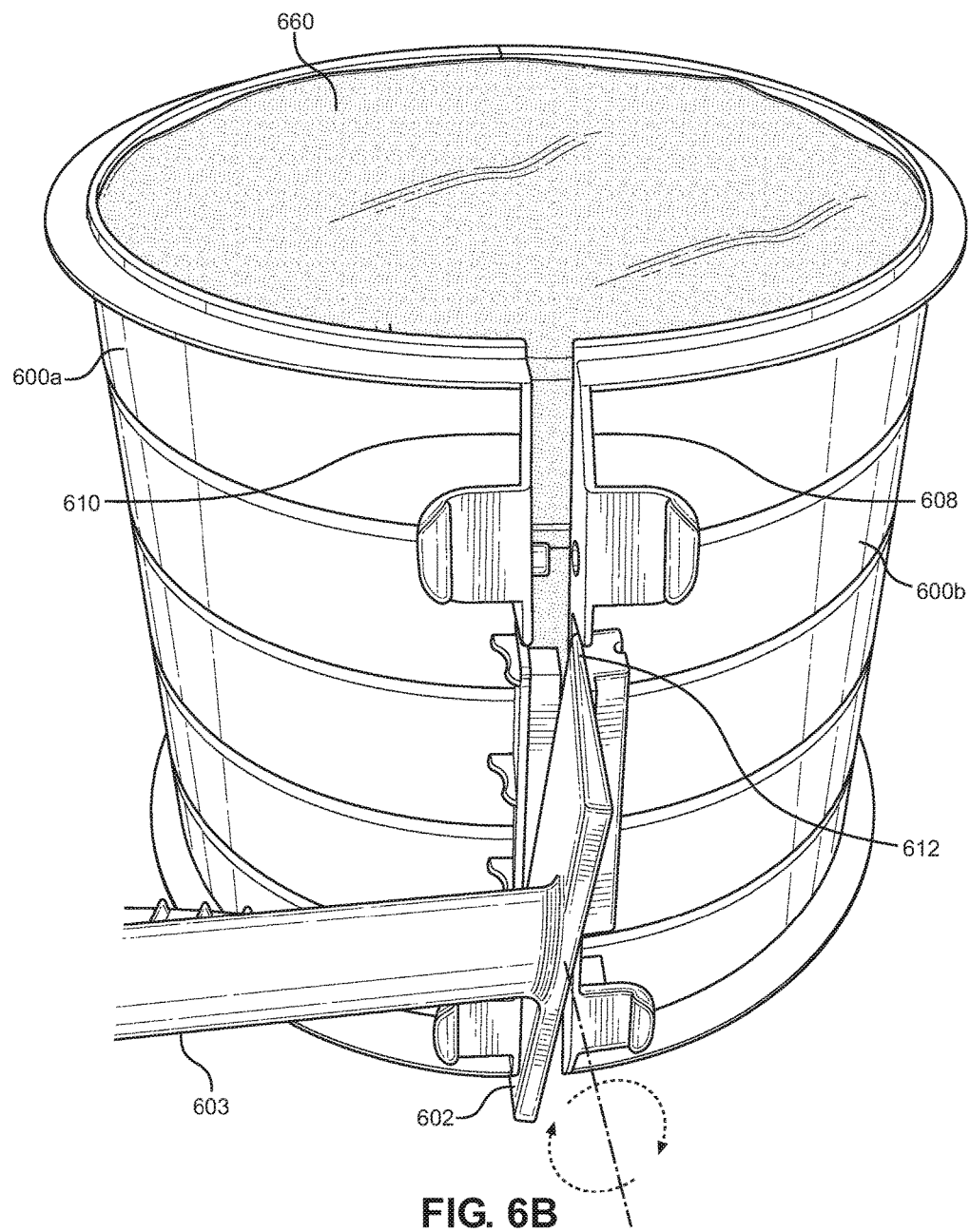
FIG. 6B is a diagram of a use of a separation tool of a mold system for separating mold sections of the mold system according to an embodiment of the present invention.
Figure 6C:
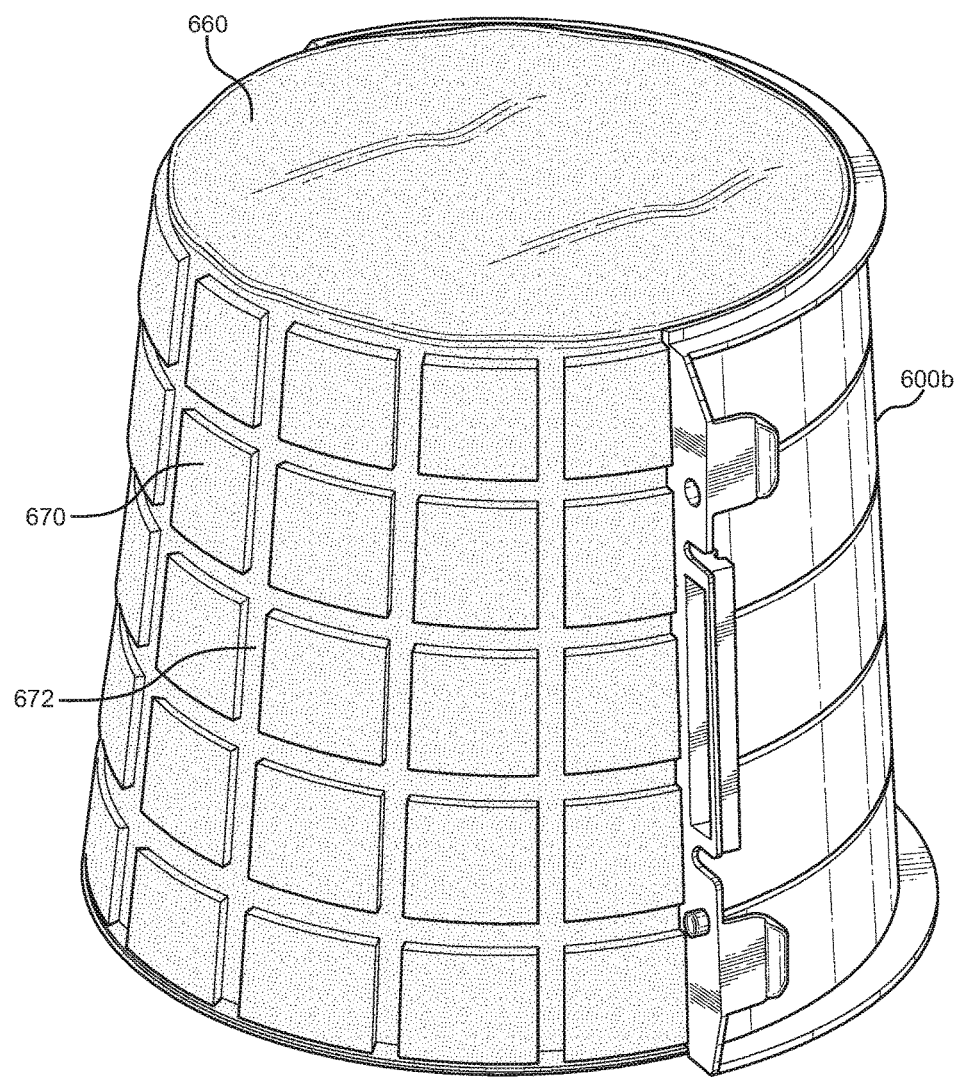
FIG. 6C is a diagram of a structure formed using a mold system and a mold section of the mold system according to an embodiment of the present invention.

FIGS. 6A, 6B, and 6C show an example mold system and process for breaking a vacuum in the mold system using a separation tool, in accordance with some embodiments. According to the example process, FIGS. 6A, 6B, and 6C show the use of an example separation tool having a wedge-shaped head 602 with an edge 612 thin enough to be inserted in the seam between vertical flanges 608 and 610 of mold sections 600a, 600b, respectively. According to some embodiments, vertical flanges 608 and 610 of mold sections 600a, 600b may be configured such that, at least at a portion of where the vertical flanges meet when joined, the respective edges of the vertical flanges 608 and 610 angle slightly away from each other to create an angle or space between the vertical flanges 608 and 610 that allows for insertion of the edge 612 of the head 602. In other embodiments, no angle or space is created between the vertical flanges 608 and 610 (e.g., they meet flush along their entirety), which may require a tool with very thin edge for slipping between the two vertical flanges.

As shown in FIG. 6B, the mold system comprising mold sections 600a and 600b has been filled with molding substance 660 (e.g., sand) to make a structure. As discussed in this disclosure, packing down the molding substance 660 may have created a vacuum, making it more difficult to separate mold sections 600a and 600b from each other and/or from the formed structure, and threatening damage to the structure.

As shown in FIG. 6A, if any securing device (e.g., a buckle) had been used to secure the mold sections 600a, 600b together and that might have interfered with placing the head 602 between the vertical flanges 608 and 610, the securing device has already been removed.

Once the edge 612 has been inserted between the vertical flanges 608 and 610 (as shown in FIG. 6A), the edge 612 and head 602 may be rotated slightly clockwise or counter-clockwise, as shown in FIG. 6B. For example, the head 602 may be rotated using attached handle 603; otherwise, such as for a tool without a handle, a blade, wedge, knife, or other device may be held and rotated by the user. As shown in FIG. 6B, rotating the edge 612 and head 602 when they are inserted between the vertical flanges 608 and 610 forces the vertical flanges 608 and 610 apart, creating a (preferably) slight gap between them. The created gap should be sufficient to allow the flow of air into the mold system to break any vacuum, but not so wide that it disturbs the formed structure. Separating the mold sections 600a and 600b in this manner may also disconnect any joining elements that were joining the mold sections together.

It will be readily understood that other types of devices may be suitable for breaking the vacuum according to the example process. For example, various types of suitable tools may comprise a wedge, blade, and/or edge that is thin enough to be inserted between the vertical flanges 608 and 610, but may have handles oriented differently relative to the head (e.g., as with respect to a putty knife, or a hatchet-like configuration of head and handle), and/or may have more handles or no handle (e.g., a user would hold the head directly and not any handle).

Once the vacuum is broken in the mold as shown in FIG. 6B, the process may be repeated, if desired or necessary, on any other seams between mold sections of the mold system. As shown in FIG. 6C, once the vacuum has been broken and the mold sections 600a and 600b are at least slightly separated (e.g., any corresponding joining elements have been disconnected), mold sections may be removed from the molded structure. In the example process, as shown in FIG. 6C, mold section 600a has been removed from the example mold structure, preferably by pulling the mold section 600a as directly away from the face of the mold structure as possible so as not to disturb any molded contours in the formed pattern of protrusions 670 and indented spaces 672. Any other mold sections (including mold section 600b) may be removed in a similar manner.

In the example of FIG. 6C, the molded structure and its molded ornamental pattern resembles a sand castle or tower structure made of bricks. As discussed in this disclosure, many types of patterns and shapes are possible; the example brick-type pattern shown in FIG. 6C is for purposes of illustration only.

Figure 7:
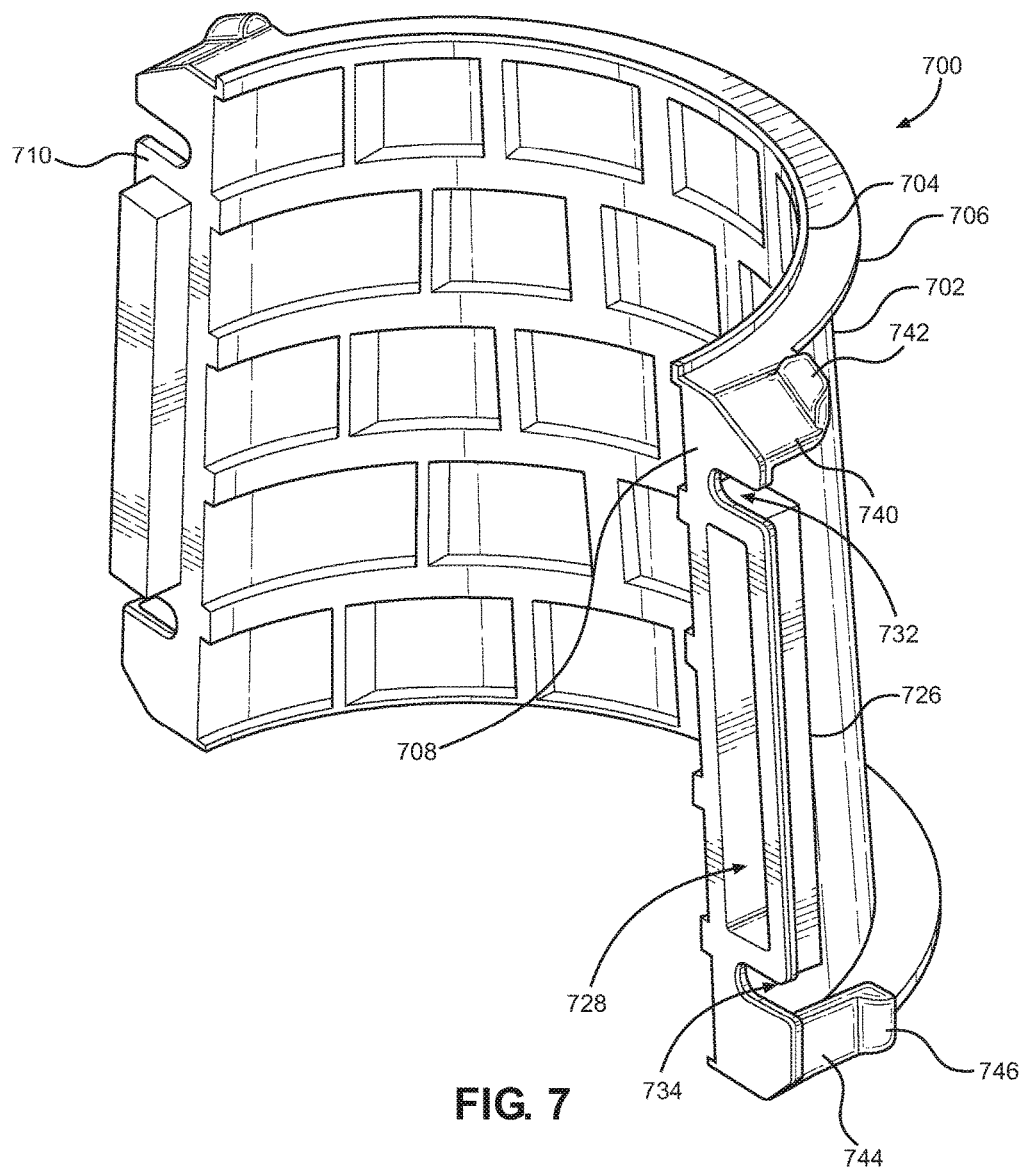
FIG. 7 is a diagram of a mold section of a mold system according to an embodiment of the present invention.

FIG. 7 shows a perspective view of an example mold section 700 with an alternative flange and tab structure that demonstrates some alternative embodiments of different features for a mold system. The mold section 700 comprises several features, such as an outer surface 702 and an inner surface, vertical flanges 708 and 710, gaps or slots 732, 734, and joining element 726 comprising a pocket 728, similar to features of the example mold section 100 of FIG. 1.

Mold section 700, however, does not comprise any peg-type joining elements. Mold section 700 also provides an example of where a joining element 726 (e.g., for receiving a corresponding joining element of another mold section) may take up a majority of the height of a vertical flange, which may provide for improved stability and security in some mold systems. Also, tabs 740 and 744 (and corresponding grip portions 742, 746) have alternative shapes. Tab 740 is not perpendicular relative to the plane of vertical flange 708, and is, in this example, connected to the upper flange 706. Such a configuration may be useful, for example, for shorter mold systems in which the height of the vertical flange limits where some elements may be placed, but may also be used for taller and/or larger mold systems.

Figure 8:
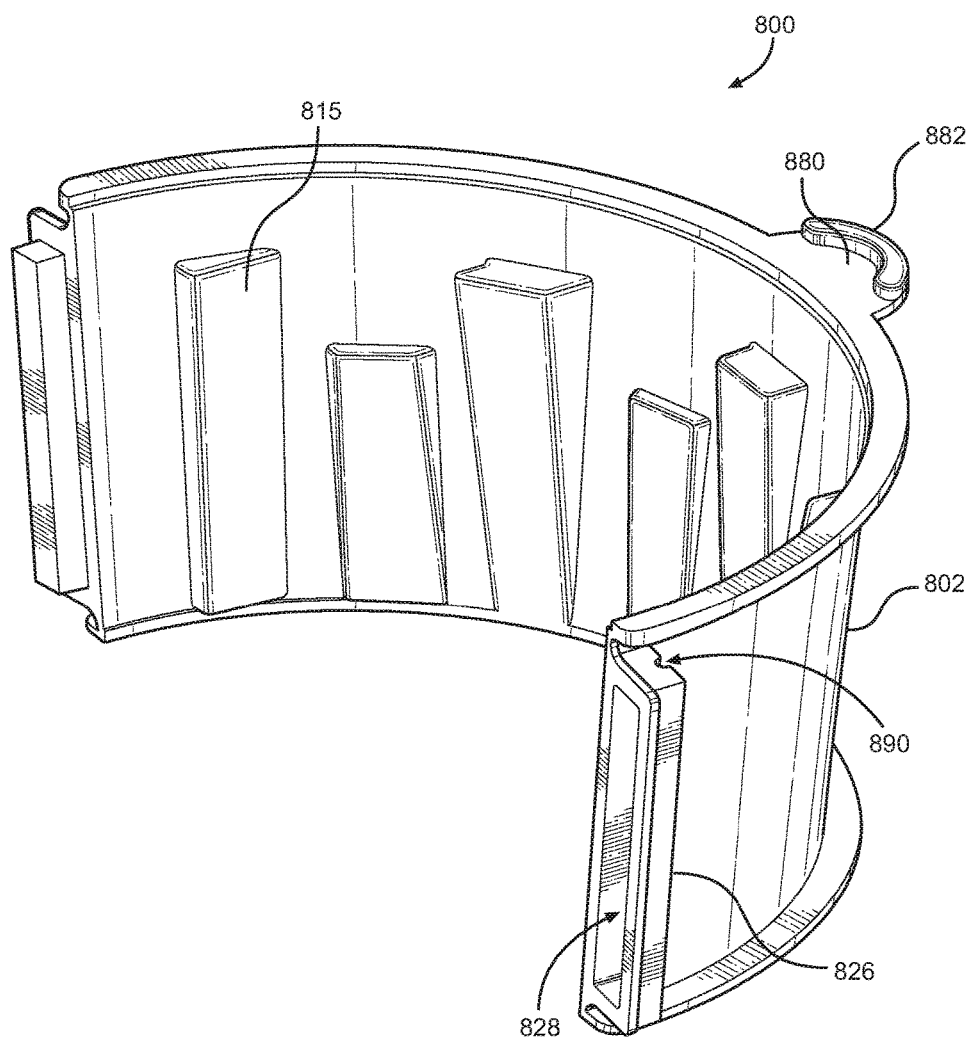
FIG. 8 is a diagram of a mold section of a mold system according to an embodiment of the present invention.

FIG. 8 shows a perspective view of an example mold section 800 with an alternative mold design and another alternative flange structure which demonstrate some alternative embodiments of different features for a mold system. The mold section 800 comprises an outer surface 802, an inner surface having protrusions 815, and joining element 826 comprising a pocket 828.

Mold section 800 does not comprise any joining elements other than joining element 826, and does not comprise any tabs along a vertical flange for assisting in separating mold sections from each other and/or from a molded structure. Instead, the joining element 826 makes up almost the entirety of the vertical flange that would connect to a corresponding vertical flange of another mold section.

Mold section 800 thus provides another example of where a joining element 826 (e.g., for receiving a corresponding joining element of another mold section) may take up a majority of the height of a vertical flange, which may provide for improved stability and security in some mold systems.

Example tab 880 and corresponding grip portion 882 are placed along the upper flange of the mold section 800. Such a configuration may be useful, for example, for shorter mold systems in which the height of the vertical flange limits or prohibits placement of any tabs of handholds along the vertical flange, but may also be used for taller and/or larger mold systems.

FIG. 8 also shows an example of slot 890 in joining element 826 that may be suitable, in accordance with some embodiments, for receiving a locking bar of a buckle or other type of locking device. In that case, the joining element 826 would also serve as a securing device support member (like buckle support member 326 of FIG. 3).

Figure 9A:
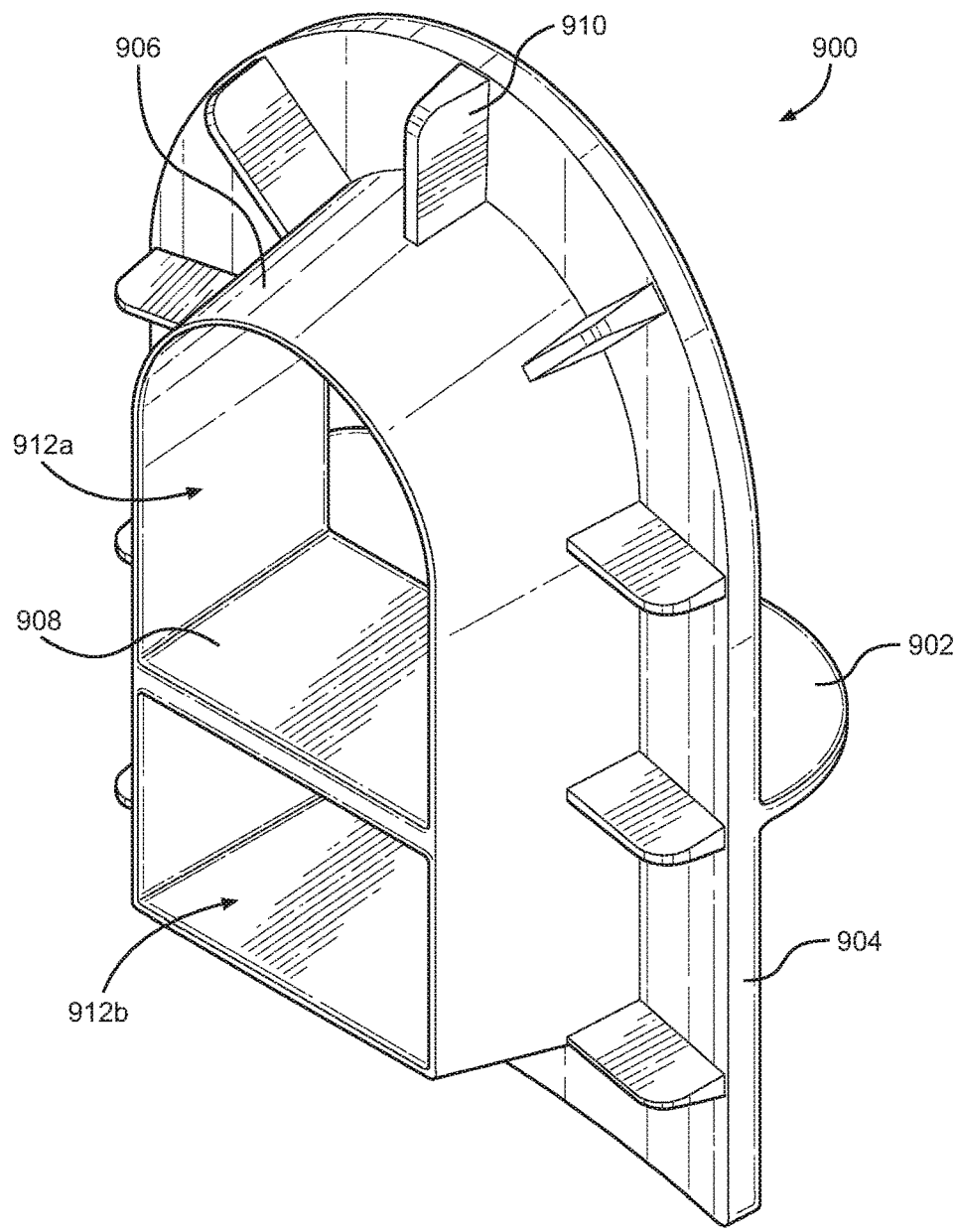
FIG. 9A and FIG. 9B are diagrams of a cutter tool according to an embodiment of the present invention.
Figure 9B:
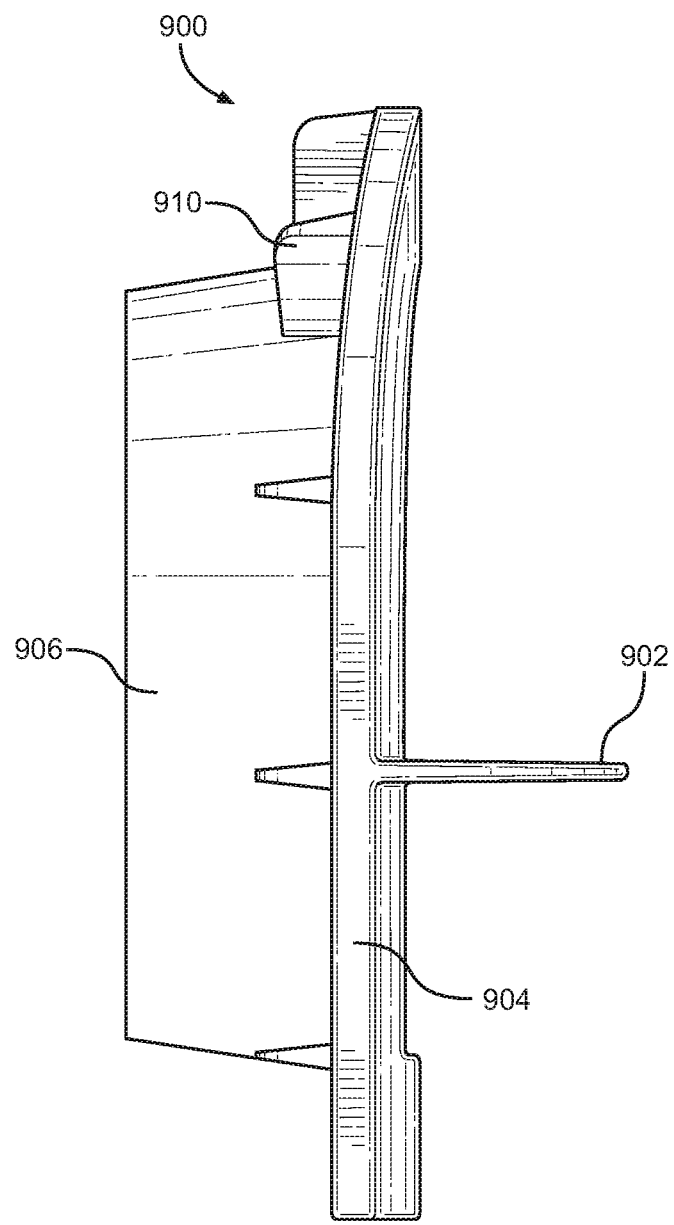

FIGS. 9A and 9B show an example cutter tool 900 for shaping and/or removing some portion of molding substance from a molded structure. By holding handle 902, a user may press the cutter portions 906 and 908 of the cutter tool 900 into a molded structure (e.g., a sand castle tower) to carve out a section of the molding substance (e.g., to create the impression of a window in a tower). The openings 912a, 912b allow the molding substance to be removed to pass through the cutter tool 900 and to be separated from the surrounding material of the structure. The cutter tool 900 may comprise one or more shaping portions 910 (of any number, size, or shape) for impressions in the surface of the structure (e.g., to create an effect of bricks forming a window).

FIGS. 9A and 9B show an example cutter tool 900 for shaping and/or removing some portion of molding substance from a molded structure. By holding handle 902, a user may press the cutter portions 906 and 908 of the cutter tool 900 into a molded structure (e.g., a sand castle tower) to carve out a section of the molding substance (e.g., to create the impression of a window in a tower). The openings 912a, 912b allow the molding substance to be removed to pass through the cutter tool 900 and to be separated from the surrounding material of the structure. The cutter tool 900 may comprise one or more shaping portions 910 (of any number, size, or shape) for impressions in the surface of the structure (e.g., to create an effect of bricks forming a window).

Figure 10A:
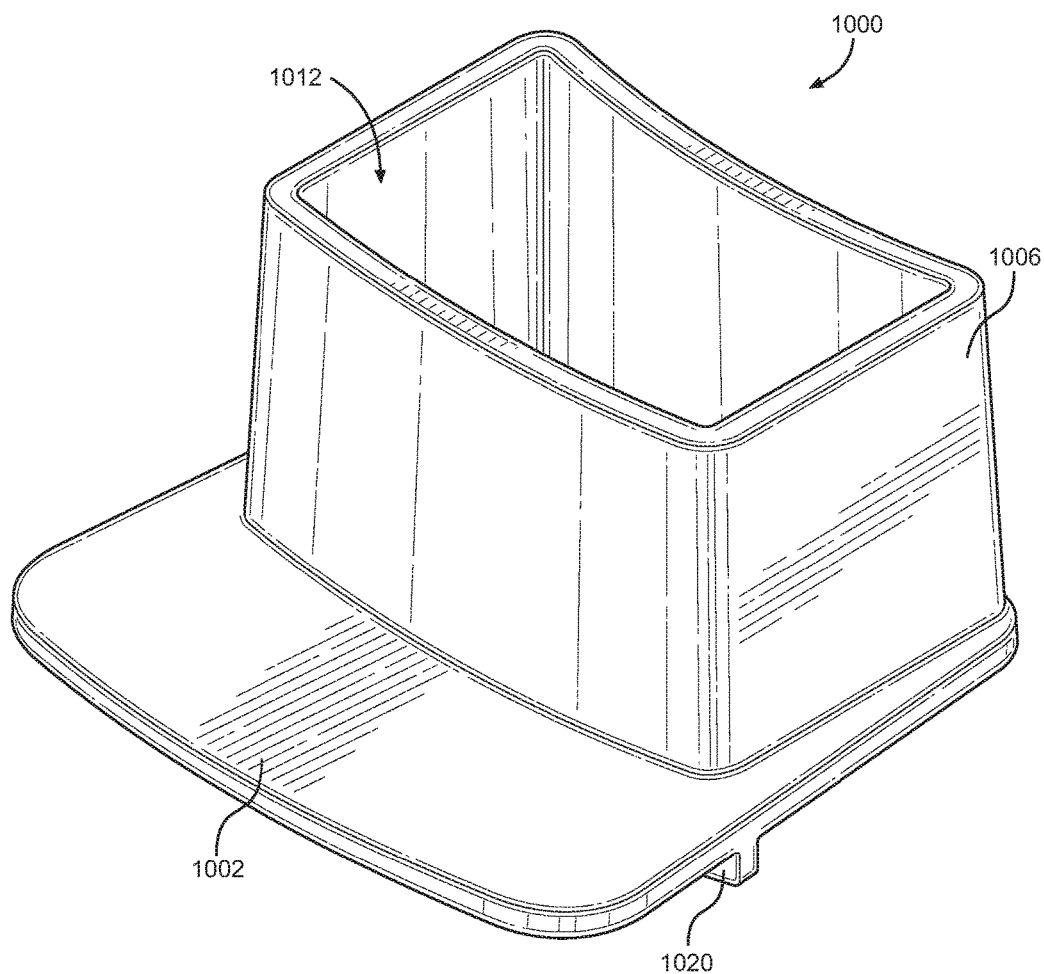
FIG. 10A, FIG. 10B, and FIG. 10C are diagrams of an edge mold according to an embodiment of the present invention.
Figure 10B:
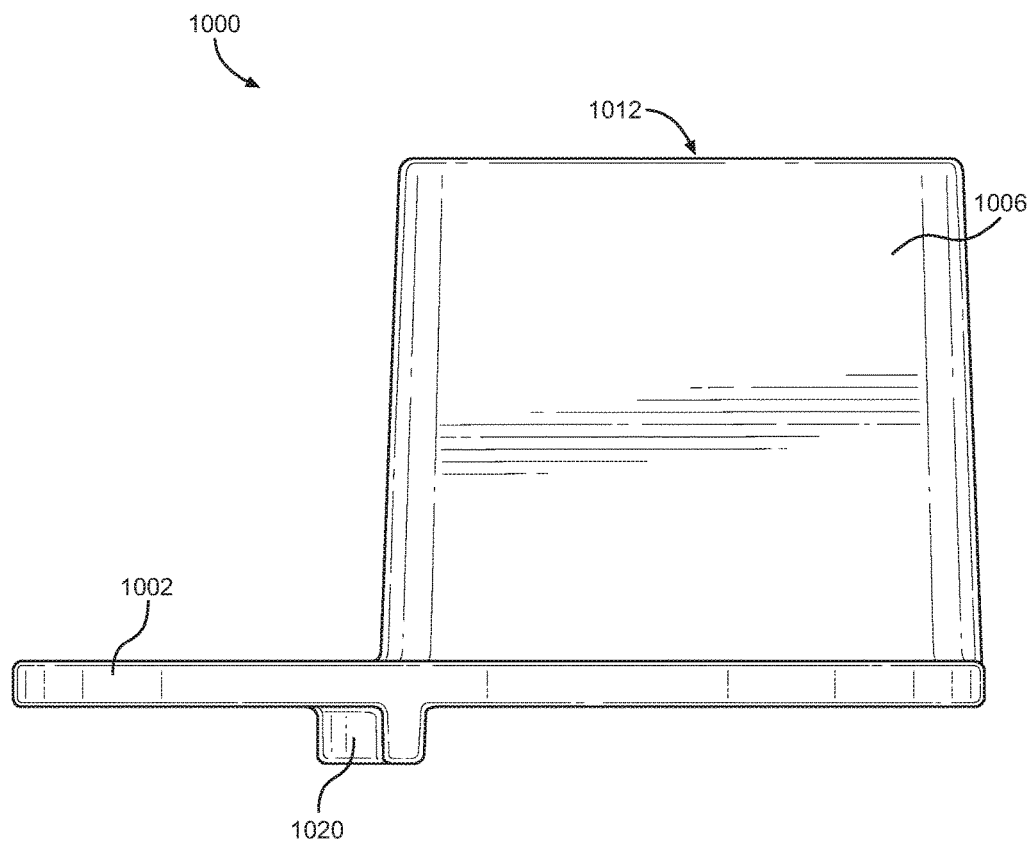
Figure 10C:
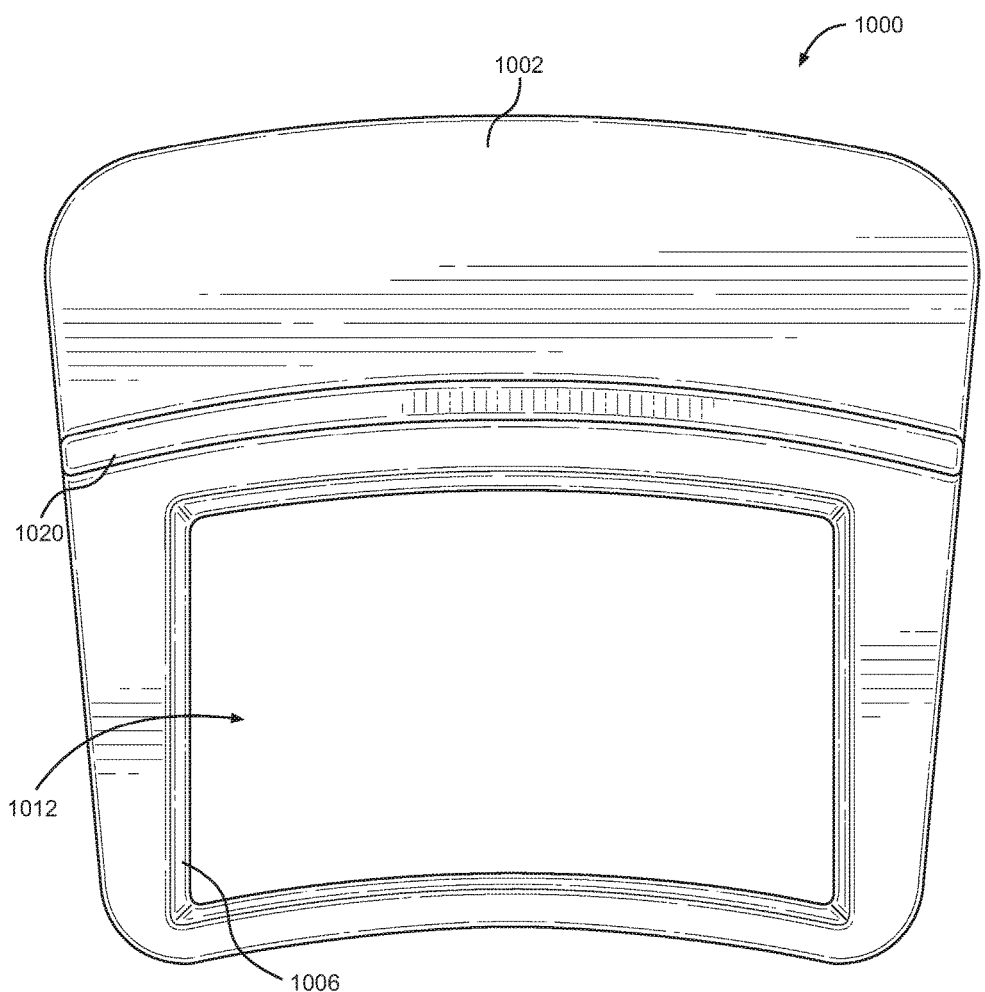

FIGS. 10A, 10B, and 10C show an example edge mold 1000 that may be useful for creating smaller mold structures on a surface of a base mold structure. In particular, edge mold 1000 is configured with a guide ridge to help align the edge mold 1000 with another mold system.

Example edge mold 1000 comprises a handle 1002, a mold section 1006 attached to the handle 1002 and forming a receptacle 1012 for receiving molding substance, and a guide ridge 1020 attached to the handle 1002. The guide ridge 1020 preferably is configured in a shape that corresponds to the shape of and may be aligned with another guide ridge of different mold system or mold section. In one example, the curvature of example guide ridge 1020 (as shown in FIG. 10C) may be configured to match the curvature of ridge 104 of example mold section 100. Accordingly, once a base structure is formed using the mold system of which mold section 100 is a part, before mold section 100 is removed, the inner perimeter of guide ridge 1020 is aligned with the outer perimeter of ridge 104. In this way, the user can ensure that a mold structure made using edge mold 1000 is lined up as desired, relative to the outer edge of any underlying structure.

Although the above example demonstrates how to achieve a desired structure along a curve, it will be readily understood that different types, shapes, and orientations of edge molds may be used to create various types of structural and visual effects, and create them consistently. In one example, rather than having the mold section 1006 aligned radially with the guide edge 1020, the mold section could be relatively askew. Regardless of what visual effect or structure desired, the guide edge 1020, if shaped to match an underlying mold system, may be used to ensure that desired molded structures may be placed consistently and uniformly relative to the edge of an underlying structure. Further, while example edge mold 1000 is configured to place a structure fairly close to the edge (i.e., the space between the guide ride 1020 and mold section 1006 is fairly small), edge mold 1000 may be configured for placing any shape at any desired distance from the edge.

Figure 11:
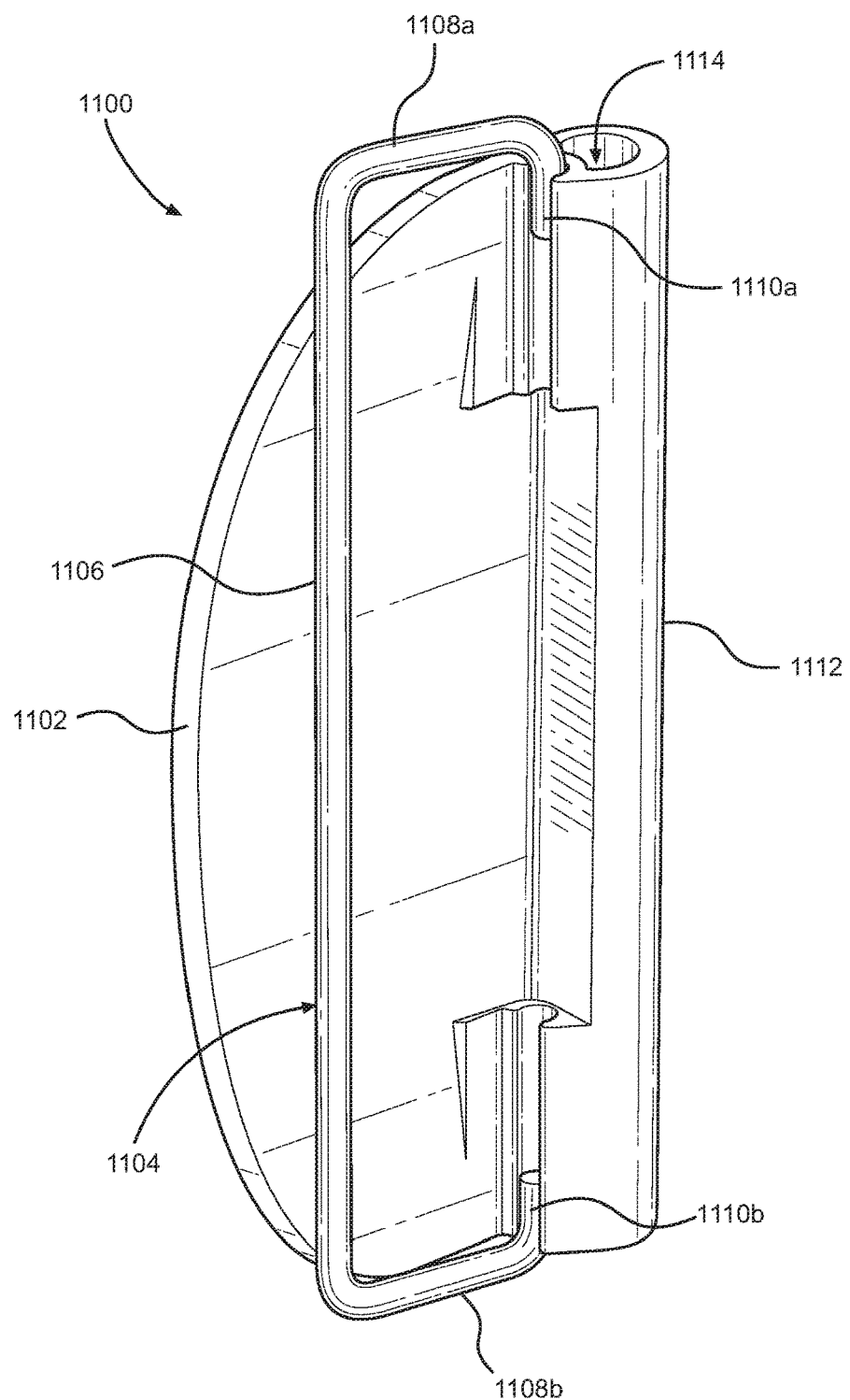
FIG. 11 is a diagram of a securing device according to an embodiment of the present invention.

FIG. 11 shows an example securing device 1100 in accordance with one or more embodiments of the present invention. In particular, the example securing device 1100 comprises a buckle-style device comprising a locking plate 1102 (e.g., made of plastic, metal, ceramic, and/or other type of material appropriate for a desired implementation) and a locking bar 1104 (e.g., a metal wire configured for securing to a mold device).

The example locking bar 1104 comprises a longitudinal portion 1106 configured for attaching to a mold device or mold section of a mold device. For example, longitudinal portion 1106 may be configured to attach to a corresponding support member of a mold section (e.g., buckle support member 326 of FIG. 3), such as by being removably joined with a corresponding slot (e.g., slot 890 of FIG. 8).

The example locking bar 1104 may comprise one or more mating portions 1110a, 1110b. In the example shown in FIG. 11, the mating portions 1110a, 1110b may be configured to snap into or otherwise attach to a corresponding portion 1112 of the locking plate 1102. In the example of FIG. 11, the portion 1112 comprises respective slots for receiving the mating portions 1110a, 1110b; any number of slots or other means of the portion 1112 to receive the mating portions may be appropriate for a given implementation.

The portion 1112, in accordance with some embodiments, may comprise a structure configured such that when the securing device 1100 is secured to a mold device, the portion 1112 abuts a support member and secures the securing device in place when the locking plate 1102 is in a locked position, and allows for removal of the securing device when the locking plate 1102 is in an open position. For example, the locked position and the open position may be determined by the angle between locking plate 1102 and the locking bar 1104.

The example locking bar 1104 may comprise one or more additional portions, such as transverse portions 1108a, 1108b, which connect the mating portions 1110a, 1110b to the longitudinal portion 1106.

Figure 12:
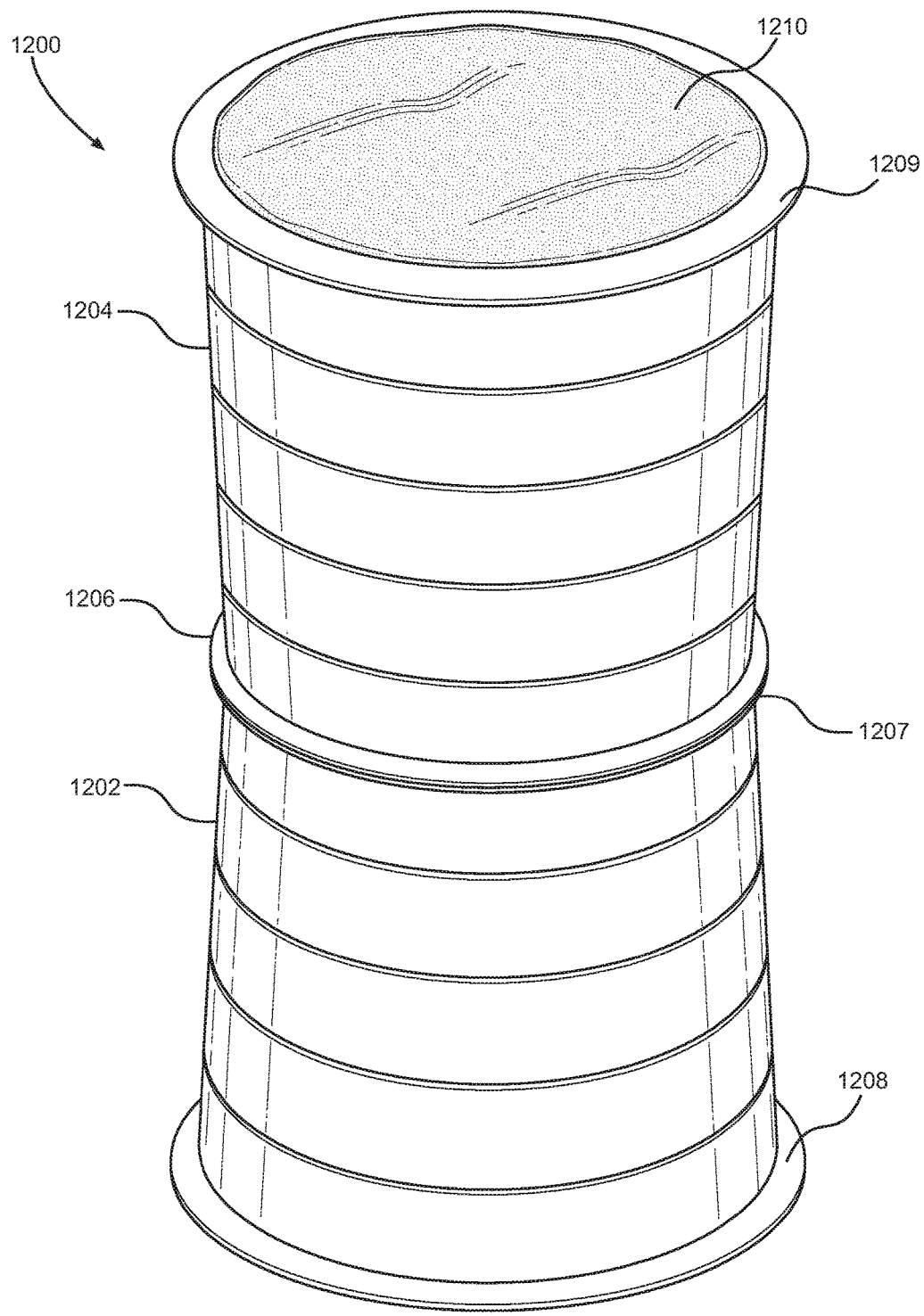
FIG. 12 is a diagram of a combination mold device according to an embodiment of the present invention.
Figure 13:
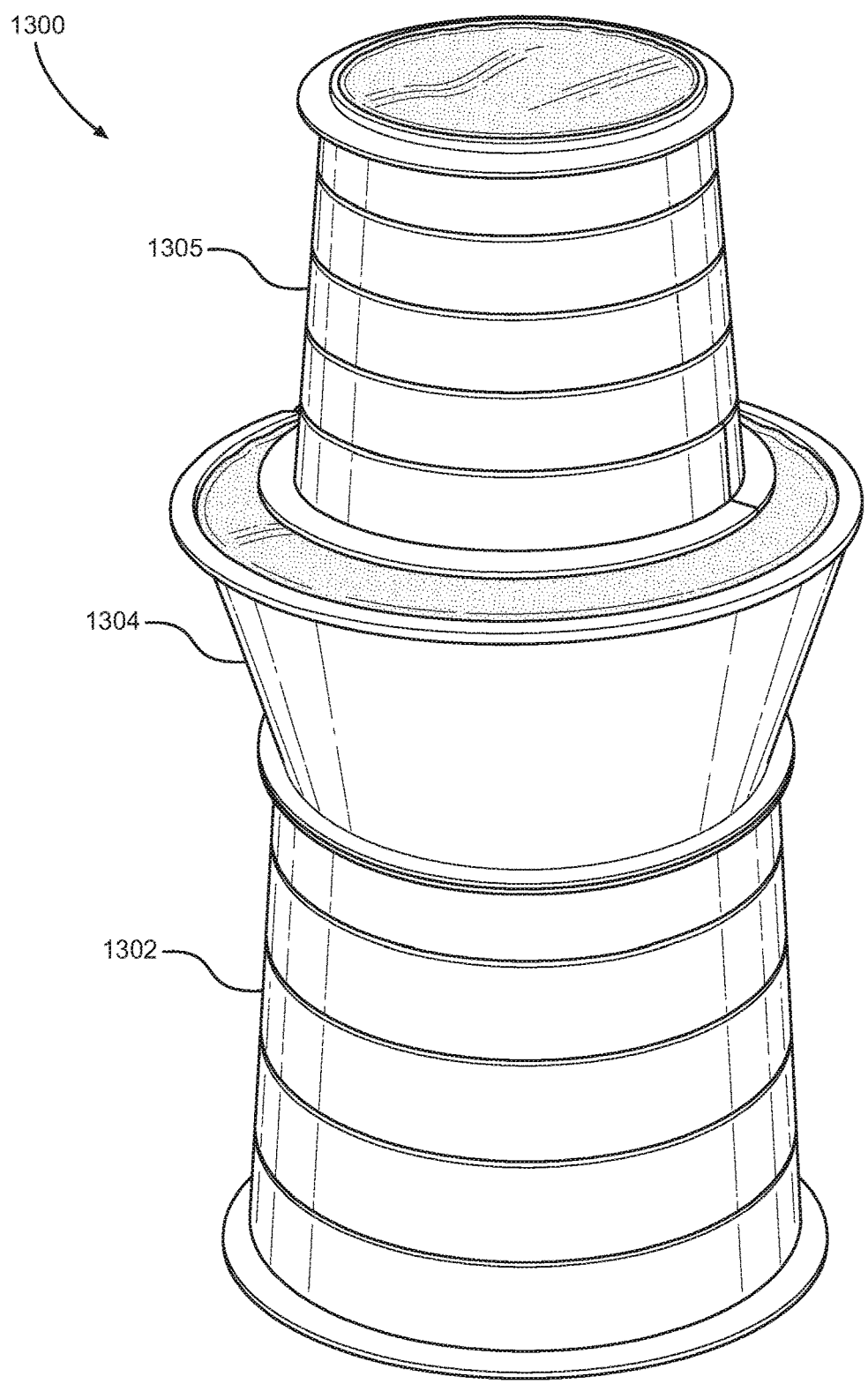
FIG. 13 is a diagram of a combination mold device according to an embodiment of the present invention.

FIGS. 12 and 13 show examples of combinations of mold devices to provide for different combination mold structures. FIG. 12 depicts an example combination mold system 1200 comprising a first mold device 1202 on which a second mold device 1204 has been placed. According to this example, a bottom opening (not shown) of second mold device 1204 has been aligned with a top opening (not shown) of first mold device 1202 by aligning flange 1206 with flange 1207. Accordingly, the combination mold system 1200 allows a user to fill both first mold device 1202 and second mold device 1204 using the top opening 1210 of second mold device 1204.

As shown in the example of FIG. 12, the flange 1206 may be substantially similar in size and shape as the flange 1207 with which it is aligned. In accordance with some embodiments, different combination mold systems may be possible using the same separate mold devices. For example, in an alternative embodiment, first mold device 1202 may be reversed (e.g., inverted so that flange 1208 is on top) and second mold device 1204 may then be stacked on top of it by aligning and abutting flange 1209 to flange 1208. Accordingly, some types of modular mold systems may allow for different combination mold structures to be made using the same mold devices, depending on how the mold devices are combined (e.g., stacked together).

FIG. 13 shows another example of a combination mold system 1300. According to the example, mold device 1305 has been placed atop mold device 1304, which has been placed atop mold device 1302. According to the depicted example, it may be easier to fill both mold devices 1302 and 1304 before placing and filling 1305. It will be readily understood, in light of this disclosure, that one or more of mold devices 1302, 1304, and 1305 may be reversed (i.e., inverted) to provide for additional combination mold structure.

It will be understood that although the example combination mold systems shown in FIGS. 12 and 13 are not shown including split molds, the depicted types of mold devices used in the example are provided for purposes of illustration of the combination mold system. It is contemplated, in accordance with some embodiments, that modular mold systems for creating combination mold structures may comprise any number of split molds, including no split molds at all.

According to some embodiments, any one or more of the mold sections, mold systems, tools, and devices described in this disclosure may be formed from one or more materials (preferably waterproof materials), including but not limited to plastics, metals, alloys, ceramics, and/or other material having sufficient strength to carry out the purpose of this invention. In one example, mold sections of mold systems may be formed by injection molding of plastic material and/or any other technique.

What is claimed is:

1. A mold system for forming a structure from a molding substance, the mold system comprising:
   a first mold section defining a first shape, and comprising:
      a first vertical flange comprising:
         a first joining component, and
         a first separation tab at a first portion of the first vertical flange; and
      a second vertical flange comprising:
         a second joining component, and
         a second separation tab at a first portion of the second vertical flange, and
   a second mold section defining a second shape, and comprising:
      a third vertical flange comprising:
         a third joining component,
         a third separation tab at a first portion of the third vertical flange; and
      a fourth vertical flange comprising:
         a fourth joining component,
         a fourth separation tab at a first portion of the fourth vertical flange; and
      wherein the first mold section and the second mold section are configured to be joined together using:
         the first joining component of the first vertical flange to connect to the third joining component of the third vertical flange such that the first separation tab is aligned opposite the third separation tab, and
         the second joining component of the second vertical flange to connect to the fourth joining component of the fourth vertical flange such that the second separation tab is aligned opposite the fourth separation tab.

2. The mold system of claim 1, wherein the first mold section and the second mold section are configured such that, when joined, the first mold section may be separated from the second mold section by a user manipulating the first separation tab away from the third separation tab.

3. The mold system of claim 2, wherein the first mold section and the second mold section are configured such that, when joined, the first mold section may be separated from the second mold section by a user manipulating the second separation tab away from the fourth separation tab.

4. The mold system of claim 1, wherein the first mold section and the second mold section are configured to be assembled into a complete mold device for forming a structure defined by the first shape and the second shape.

5. The mold system of claim 1, wherein the first mold section and the second mold section are configured to be assembled into a complete mold device having a first opening and a second opening opposite the first opening, each of the first opening and the second opening allowing for inserting a molding substance into the complete mold device.

6. The mold system of claim 1, wherein the first mold section and the second mold section are configured to be assembled into a complete mold device having a first opening defined by a first opening flange and a second opening, opposite the first opening, defined by a second opening flange,
   each of the first opening flange and the second opening flange being configured to join to an opening flange of a second complete mold device.

7. The mold system of claim 1, further comprising:
a securing device for securing the first mold section to the second mold section when the first mold section is joined to the second mold section.

8. The mold system of claim 7, wherein the securing device comprises a buckle comprising a locking plate and a locking bar, wherein the locking plate is separable from the locking bar.

9. The mold system of claim 1, further comprising:
a separation tool for inserting between the first mold section and the second mold section to separate the first mold section from the second mold section.

10. The mold system of claim 1, further comprising:
a separation tool for inserting between the first vertical flange of the first mold section and the third vertical flange of the second mold section.

11. The mold system of claim 1,
wherein the first mold section and the second mold section are configured to be assembled into a complete mold device; and
further comprising:
a tool for breaking a vacuum in the complete mold device.

12. The mold system of claim 1,
wherein the first vertical flange further comprises a fifth separation tab at a second portion of the first vertical flange;
wherein the third vertical flange further comprises a sixth separation tab at a second portion of the third vertical flange; and
wherein when the first mold section is connected to the second mold section the fifth separation tab is aligned opposite the sixth separation tab.

13. The mold system of claim 12,
wherein the second vertical flange further comprises a seventh separation tab at a second portion of the second vertical flange;
wherein the fourth vertical flange further comprises an eighth separation tab at a second portion of the fourth vertical flange; and
wherein when the first mold section is connected to the second mold section the seventh separation tab is aligned opposite the eighth separation tab.

\* \* \* \* \*